United States Patent
Okada

(10) Patent No.: US 6,476,517 B1
(45) Date of Patent: Nov. 5, 2002

(54) VEHICLE AUTOMATIC DOOR-LOCKING SYSTEM USING IDENTIFIER SIGNAL TRANSMITTING PORTABLE UNIT

(75) Inventor: Hiroki Okada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 19 days.

(21) Appl. No.: 09/629,821

(22) Filed: Jul. 31, 2000

(30) Foreign Application Priority Data

Aug. 27, 1999 (JP) ............................................ 11-241357
May 15, 2000 (JP) ....................................... 2000-141404

(51) Int. Cl.$^7$ ............................................. H01H 47/22
(52) U.S. Cl. ....................... 307/10.2; 307/9.1; 307/10.1
(58) Field of Search ............................... 307/10.2, 10.1, 307/9.1; 340/426, 825.72, 825.31

(56) References Cited

U.S. PATENT DOCUMENTS

| 5,929,769 A | * | 7/1999 | Garnault ................ | 340/825.31 |
| 5,973,611 A | * | 10/1999 | Kulha et al. ........... | 340/825.31 |
| 6,208,239 B1 | * | 3/2001 | Muller et al. ............... | 340/426 |

FOREIGN PATENT DOCUMENTS

| JP | A 62-37479 | 2/1987 |
| JP | A 11-93477 | 4/1999 |

* cited by examiner

Primary Examiner—Fritz Fleming
Assistant Examiner—Robert DeBeradinis
(74) Attorney, Agent, or Firm—Oliff & Berridge, PLC

(57) ABSTRACT

Automatically controlled door-locking system for locking at least an operator's door of a vehicle, including a power-operated device for selectively locking and unlocking at least the vehicle operator's door, a symptom detecting device or detecting a symptom indicating that the vehicle operator has an intention of getting off the vehicle, a communication device having a signal-receiving device and an identifier-signal requesting device operable upon detection of the above-indicated symptom, to transmit to a portable unit a request signal requesting the portable unit to transmit back to the signal-receiving device an identifier signal identifying the portable unit, and a locking-device controller operable when the identifier signal received by the signal-receiving device identifies the vehicle, to operate the power-operated locking device for locking at least the vehicle operator's door after the door is closed.

20 Claims, 12 Drawing Sheets

FIG. 9

|  | WHILE DOOR IS CLOSED | | DETECTED IN AREA B WHILE DOOR IS OPEN? | CONTROL MODE |
|---|---|---|---|---|
|  | DETECTED IN AREA "A"? | DETECTED IN AREA "B"? | | |
| STATE1 | YES | NO | – | ENGINE START STANDBY MODE |
| STATE2 | YES | YES | – | " |
| STATE3 | NO | YES | – | DOOR LOCKING STANDBY MODE |
| STATE4 | NO | NO | YES | " |
| STATE5 | NO | NO | NO | ALARM INDICATING AND DOOR LOCKING STANDBY MODE |

VEHICLE AUTOMATIC DOOR-LOCKING SYSTEM USING IDENTIFIER SIGNAL TRANSMITTING PORTABLE UNIT

This application is based on Japanese Patent Application Nos. 11-241357 filed Aug. 27, 1999 and 2000-141404 filed May 15, 2000, the contents of which are incorporated hereinto by reference.

BACKGROUND OF THE INVENTION

1. Field of the Invention

The present invention relates in general to a control system for controlling a state of a vehicle such as an automobile running on a roadway, an electric railcar running on rails, a tramcar, a ship and an airplane, and more particularly to an automatically operated and controlled door-locking system of such a vehicle, which is adapted to automatically lock at least one door of the vehicle in its closed position.

2. Discussion of Related Art

There is known an automatically door-locking system for automatically locking a door of an automotive vehicle in its closed position. This door-locking system is provided with a power-operated locking device including a power source and an actuator operable by the power source to selectively place the closed door in its locked or unlocked state. The door-locking system, which is provided on an automotive vehicle as a vehicle, is considered to be a control system adapted to control the operating state of the power-operated locking device, as a state of the vehicle. Therefore, the door-locking system may be considered as a vehicle state control system for controlling a state of a vehicle.

An example of such a door-locking-device control system for a vehicle is disclosed in JP-A-62-37479. This door-locking-device control system includes (1) a door-closure detecting device operable to detect that a door of the vehicle is operated from an open position thereof to a closed position thereof, (2) a communication device operable to communicate with a portable unit to be carried by the vehicle operator, while the portable unit is located within a predetermined distance from the vehicle, the communication device including an identifier-signal requesting device and a signal-receiving device, the identifier-signal requesting device being operable upon detection of the closed position of the door by the door-closure detecting device, to transmit to the portable unit a request signal which requests the portable unit to transmit back to the signal-receiving device an identifier signal representative of an identifier identifying the portable unit, the signal-receiving device being operable to receive the identifier signal, and (3) a locking-device controller operable when the identifier represented by the identifier signal received by the signal-receiving device matches an identifier of the vehicle, to operate the power-operated locking device of the door-locking system to lock the door in the closed position.

The door-locking device control system disclosed in the above-identified publication JP-A-62-37479 is arranged such that the identifier-signal requesting device is operated to transmit to the portable unit the request signal requesting the portable unit to transmit the identifier signal, when the door is brought into its closed position. This arrangement is based on a relatively high probability that the vehicle operator has left or got off the vehicle, when the door has been closed. Where the identifier represented by the identifier signal received by the signal-receiving device from the portable unit matches the identifier of the vehicle per se, the locking-device controller is operated to operate the power-operated locking device to lock the door in the closed position. However, the locking-device controller is adapted to operate the power-operated locking device only when the portable unit is moved apart from the vehicle by a distance larger than the above-indicated predetermined distance, that is, only when the communication device has become incapable of communicating with the portable unit. The identifier-signal requesting device of the communication device is arranged to transmit the request signal intermittently at a certain time interval after the door has been brought into its closed state. The fact that the communication device has become incapable of communicating with the portable unit is an indication that the portable unit is located at a position which is apart from the vehicle by a distance more than the predetermined distance within which the communication with the communication device is available. Based on this fact, the power-operated locking device is operated to lock the closed door in the closed position.

In the automatically controlled door-locking system for an automotive vehicle described above, the door is not locked in the closed position if the signal-receiving device of the communication device does not receive any identifier signal from the portable unit, that is, if the locking-device controller does not confirm that the received identifier identifying the portable unit identifies the vehicle per se. This may happen, for example, when the vehicle operator who has got off the vehicle swings the opened door back to the closed position, and quickly moves away from the vehicle such that the hand which has once pushed the door to its closed position releases the door while the vehicle operator moves away from the vehicle, so that the vehicle operator is soon distant from the vehicle by more than the above-indicated predetermined distance, and as a result the communication device is no longer capable of communicating with the portable unit carried by the operator after the door has been returned to the closed position. In this event, the locking-device controller will not activate the power-operated locking device to lock the closed door.

While the conventional door-locking system for a vehicle has been described above, a similar problem is encountered in other systems for controlling a state of a vehicle.

SUMMARY OF THE INVENTION

It is therefore an object of the present invention to provide a vehicle state control system having an improved degree of control reliability, for example, an improved vehicle door-locking system capable of automatically locking a door in the closed position even if the communication device is incapable of communicating with the portable unit soon after the door has been placed in the closed position, as in an automatically controlled door-locking system according to the following first mode (1) of this invention, or an improved vehicle door-locking system capable of accurately detecting the location of the portable unit and controlling the power-operated locking device according to a result of the detection, as in an automatically controlled door-locking system according to the following sixteenth mode (16) of the invention.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) An automatically controlled door-locking system for automatically locking at least one door of a vehicle, which includes a vehicle-operator's door provided for an operator of the vehicle, the door-locking system comprising:

a power-operated locking device including a power source, and an actuator operated by the power source for selectively locking and unlocking the at least one door placed in a closed position thereof;

a symptom-detecting device operable to detect a symptom indicating that the operator of the vehicle has an intention of getting off the vehicle;

a portable unit to be carried by the operator of the vehicle;

a first communication device operable to communicate with the portable unit while the portable unit is located within a predetermined communication area, the communication device including a first identifier-signal requesting device and a first signal-receiving device, the first identifier-signal requesting device being operable, upon detection of the symptom by the symptom detecting device, to transmit to the portable unit a request signal requesting the portable unit to transmit back to the signal-receiving device an identifier signal representative of an identifier identifying the portable unit; and a locking-device controller, operable when the identifier represented by the identifier signal received by the first signal-receiving device matches an identifier identifying the vehicle, to operate the power-operated locking device for locking the at least one door after the vehicle-operator's door is closed.

In the present automatically controlled door-locking system, the first request signal requesting the portable unit to transmit an identifier signal is transmitted to the portable unit, when the symptom detecting device has detected that the vehicle operator has an intention of getting off the vehicle. The identifier signal transmitted from the portable unit is received by the first signal-receiving device. When the identifier represented by the received identifier signal matches the identifier identifying the vehicle, that is, when the received identifier signal identifies the vehicle, the locking-device controller activates the power-operated locking device to lock the at least one door including the vehicle-operator's door, after the at least one door is closed. The symptom detecting device is adapted to detect a symptom indicative of the vehicle operator's intention of getting off the vehicle, before detecting a symptom indicating a high probability that the vehicle operator has actually got off the vehicle. When the symptom-detecting device has detected the symptom indicative of the operator's intention of getting off the vehicle, the first identifier-signal requesting device is activated to transmit the request signal requesting the portable unit to transmit its identifier signal. The present arrangement permits the at least one door of the vehicle to be locked even in the case where the vehicle operator who has got off the vehicle swings the operator's door to its closed position and quickly moves away from the vehicle. Conventionally, the at least one door of the vehicle is not locked in its closed position in the above-indicated case. The present door-locking system permits the at least one door to be locked even where the vehicle operator who has got off the vehicle quickly moves away from the vehicle to a location outside the predetermined communication area in which the first communication device is capable of communicating with the portable unit.

The symptom-detecting device is arranged to detect any one of symptoms indicating that the vehicle operator is going to get off the vehicle. These symptoms may include, for example: a change of the vehicle condition from a mobile state to an immobile state in which the vehicle cannot be moved, for instance, a change of an ignition switch of the vehicle from its ON state to its OFF state; releasing of the vehicle operator's seat belt (a change of the seat belt from its used state to its unused state); a change of the vehicle operator's door from its closed position to its open position; and a decrease of a load acting on the vehicle operator's seat below a predetermined lower limit. The symptom-detecting device may be provided in the first communication device or the locking-device controller, or may be provided independently of the first communication device and the locking-device controller. The symptom-detecting device may be referred to as a getting-off intention detecting device for detecting an intention of the vehicle operator of getting off the vehicle.

The actuator of the power-operated locking device may be an electric motor operated to move a locking member provided on each of the at least one door, from its releasing position to its locking position in which the closed door is locked. In this case, the at least one door can be locked by controlling the electric motor.

The at least one door including the vehicle operator's door may be a pivoting or sliding type door which is pivotable or slidable relative to the body of the vehicle. The pivoting type door may be pivotable about an axis which extends in the substantially vertical horizontal direction when the vehicle has a normal attitude on a flat roadway. Where the pivoting type door is pivotable about the substantially horizontally extending axis, it is generally called a hatchback door. The sliding type door is generally a linearly sliding door. The vehicle operator's door is usually provided adjacent to the vehicle operator's seat, but need not be located adjacent to the vehicle operator's seat.

The predetermined communication area in which the first communication device is capable of communicating with the portable unit is an overlapping area of a receiving area in which the request signal transmitted by the first identifier-signal requesting device can be received by the portable unit, and a transmitting area from which the identifier signal is transmitted by the portable unit toward the signal-receiving device such that the identifier signal can be received by the first signal-receiving device. The overlapping area is determined by the operating characteristics and the locations of the first identifier-signal requesting device and the first signal-receiving device, and other factors. The operating characteristics are determined by the capacities and orientations of antennas of the first identifier-signal requesting device and the second signal-receiving device. Where the directional antennas are used, the above-indicated receiving and transmitting areas are influenced by the orientations of the antennas. The communication area may be an area whose major part lies within the body of the vehicle, or an area whose major part is outside the body of the vehicle.

In the present specification, the identifier signal transmitted by the portable unit is considered to identify the vehicle if the identifier represented by the identifier signal matches the identifier of the vehicle. These two identifiers which match each other may be two identical identifiers or different identifiers. In the case of the two identical identifiers, the identifier represented by the identifier signal received by the signal-receiving device is the same as the identifier of the vehicle which is stored in the locking-device controller. The two different identifiers match each other when these two identifiers satisfy a predetermined condition. For instance, the two different identifiers match each other when a sum of values represented by the identifiers is equal to a predetermined value. The portable unit may also serve as an ignition key used to turn on and off the ignition switch of the vehicle. This portable unit has a key portion having a specific configuration identifying the vehicle, and the identifier signal transmitted by this portable unit identifies that vehicle.

When the identifier represented by the identifier signal received by the first signal-receiving device identifies the vehicle, that is, matches the identifier identifying the vehicle, the locking-device controller activates the power-operated locking device to lock the at least one door including the vehicle operator's door, after the at least one door is closed. The locking-device controller may be arranged to activate the locking device to lock each of the at least one door immediately after or a predetermined time after the door is placed into its closed position, or when a predetermined condition of the vehicle is satisfied after the door is placed into its closed position.

(2) An automatically controlled door-locking system according to the above mode (1), wherein the symptom detecting device detects the above-indicated symptom, when the vehicle is placed in a state in which the vehicle is not likely to be started and/or when a seat belt which has been used by the vehicle operator is released.

When the vehicle is placed in a state in which the vehicle cannot be or is not like to be started, or when the vehicle operator has released the seat belt, it indicates a high probability that the vehicle operator is going to get off the vehicle. The above-indicated state in which the vehicle is not likely to be started may be a state in which a main power switch or an ignition switch is turned from its on state to its off state, or a key for turning on and off the main power switch or ignition switch is removed. The releasing of the vehicle operator's seat belt can be detected by an appropriate seat-belt detector switch.

(3) An automatically controlled door-locking system according to the above mode (1) or (2), wherein the symptom detecting device detects the symptom, when the vehicle-operator's door is operated from a closed position thereof to an open position thereof.

When the vehicle-operator's door is operated from the closed position to the open position, it indicates a high probability that the vehicle operator is going to get off the vehicle. Described more specifically, an opening action of the vehicle operator's door indicates a higher probability that the vehicle operator is going to get off the vehicle, than a switching of the vehicle to a state in which the vehicle is not likely to be started, or a releasing action of the seat belt by the vehicle operator. In the above mode (3) of the invention, the first identifier-signal requesting device is commanded to transmit the request signal when the vehicle-operator's door is opened. This arrangement is effective to avoid unnecessary operation of the identifier-signal requesting device, leading to a reduced amount of consumption of an electric energy by the first communication device.

The probability that the vehicle operator is going to get off the vehicle is higher, if the symptom detecting device is arranged to detect the above-indicated symptom when the vehicle-operator's door is opened after the vehicle has been placed in the state in which the vehicle is not likely to be started, and/or after the vehicle-operator's seat belt has been released.

(4) An automatically controlled door-locking system according to any one of the above modes (1)–(3), wherein the locking-device controller includes a portable-unit detecting device for determining that the portable unit is located within the predetermined communication area, when the identifier represented by the identifier signal received by the first signal-receiving device of the first communication device matches the identifier of the vehicle, the locking-device controller operating the power-operated locking-device to lock the at least one door in the closed position, when the portable-unit detecting device has determined that the portable unit is located within the predetermined communication area.

In the above mode (4) of the invention, the portable-unit detecting device determines that the portable unit is located within the predetermined communication area, when the identifier represented by the identifier signal transmitted by the portable unit and received by the first signal-receiving device matches the identifier of the vehicle. The portable-unit detecting device includes a checking portion for determining whether the identifier represented by the received identifier signal matches the identifier of the vehicle. If the two identifiers do not match each other, the portable-unit detecting device determines that the portable unit is not located in the communication area. In the case where the first signal-receiving device does not receive an identifier signal from the portable unit, the two identifiers are not considered to match each other. However, the portable-unit detecting device may be adapted to determine whether the portable unit is located within the communication area, depending upon (1) whether the two identifiers match each other, and/or (2) whether the identifier signal transmitted from the portable unit in response to the request signal received from the first identifier-signal requesting device has been received by the first signal-receiving device. In this case, the portable-unit detecting device determines that the portable unit is not located within the predetermined communication area, if the first signal-receiving device has not received the identifier signal from the portable unit within a predetermined time after the request signal has been transmitted.

(5) An automatically controlled door-locking system according to any one of the above modes (1)–(4), wherein the first identifier-signal requesting device intermittently transmits the request signal at a predetermined time interval after detection of the symptom by the symptom detecting device.

The intermittent transmission of the request signal requires a reduced amount of consumption of electric energy by the first communication device and the portable unit, than the continuous transmission of the request signal. The present technical feature is applicable not only to the first identifier-signal requesting device which is operable upon detection of a symptom that the vehicle operator has an intention of getting off the vehicle, as described above, but also to a fourth identifier-signal requesting device which is operable upon detection that the vehicle operator has got off the vehicle, as described below, and an identifier-signal requesting device which is included in each of a plurality of specific-area communication devices, as also described below.

(6) An automatically controlled door-locking system according to the above mode (5), wherein the first identifier-signal requesting device transmits the request signal at a first predetermined time interval before a predetermined condition is satisfied, and at a second predetermined time interval longer than the first predetermined time interval after the predetermined condition is satisfied.

The first identifier-signal requesting device which is operated upon detection of a symptom indicating that the vehicle operator has an intention of getting off the vehicle may be adapted to intermittently transmit the request signal at the predetermined constant time interval. However, the request signal may be transmitted at a longer time interval after the predetermined condition is satisfied, for example, after the identifier represented by the identifier signal received by the first signal-receiving device matches the identifier of the vehicle. In this respect, it is noted that a need of determining whether the received identifier signal identifies the vehicle is reduced or eliminated after it is detected that the received identifier signal identifies the vehicle.

It is also possible that the request signal is normally transmitted continuously, but is transmitted intermittently after the predetermined condition is satisfied. The time interval at which the request signal is transmitted may be considered to be increased (to infinity) where the continuous or intermittent transmission of the request signal is terminated.

(7) An automatically controlled door-locking system according to any one of the above modes (1)–(6), wherein the locking-device controller includes at least one of a data memory for storing data indicative of a determination that the identifier represented by the identifier signal received by the first signal-receiving device matches the identifier of the vehicle, and a request terminating portion, operable upon the determination, to command the first identifier-signal requesting device to terminate transmission of the request signal.

Where the data memory is provided to store data indicative of the determination that the identifier represented by the received identifier signal matches the identifier of the vehicle, the stored data may be used by the locking-device controller in determining whether the power-operated locking device is operated to lock the at least one door of the vehicle. For instance, the stored data may be used in combination with a result of a determination based on an identifier signal received in response to a request signal transmitted when there is a high probability that the vehicle operator has got off the vehicle, as in preferred embodiments of the invention described below. The stored data may be considered to be data indicating that the portable unit has been detected in the predetermined communication area. If this data is not stored in the data memory, it means that the received identifier signal does not identify the vehicle, namely, the portable unit whose identifier signal identifies the vehicle is not located The request terminating portion which terminates the transmission of the request signal from the first identifier-signal requesting device is effective to reduce the required amount of consumption of the electric energy by the first identifier-signal requesting device and the portable unit. Further, it is reasonable to terminate the transmission of the request signal when it is determined that the identifier represented by the received identifier signal matches the identifier of the vehicle. Once the identifier represented by the received identifier signal matches the identifier of the vehicle, it is usually not necessary to determine whether the received identifier signal identifies the vehicle, that is, whether the portable unit is located within the communication area.

(8) An automatically controlled door-locking device according to any one of the above modes (1)–(7), further comprising an indicator operable when the identifier represented by the identifier signal received by the first signal-receiving device matches the identifier of the vehicle, to provide an indication that the identifier represented by the first identifier signal matches the identifier of the vehicle.

In the door-locking device according to the above mode (8), the indicator provides an indication that the identifier represented by the identifier signal received by the first signal-receiving device upon detection of the above-indicated symptom matches the identifier of the vehicle, when these two identifiers match each other. This indication enables the vehicle operator to recognize that the at least one door of the vehicle is locked in its closed position.

The indicator may be provided on either the vehicle or the portable unit. In the former case, the indicator may be provided on the outer side of the vehicle body so that the indication provided by the indicator can be noticed by the vehicle operator outside the vehicle body. Where the indicator is disposed within the vehicle body, the indicator is preferably a buzzer or other indicator adapted to generate a sound or voice that can be heard by the vehicle operator outside the vehicle body, or a light disposed such that the illuminated light can be viewed by the vehicle operator outside the vehicle body. Where the portable unit includes the indicator, the indicator is activated by a signal received from the first communication device when the locking-device controller determines that the identifier represented by the first identifier signal matches the identifier of the vehicle. In this case, the vehicle operator carrying the portable unit can be informed of the determination that the portable unit in the communication area has been detected by the communication device.

(9) An automatically controlled door-locking system according to any one of the above modes (1)–(8), wherein when the identifier represented by the identifier signal received by the first signal-receiving device of the first communication device matches the identifier of the vehicle, the locking-device controller operates the power-operated locking device to lock the at least one door when a predetermined condition is satisfied after the vehicle-operator's door is closed.

The power-operated locking device may be activated by the locking-device controller to lock at least one door in the closed position, in response to the closure of the vehicle-operator's door. However, the power-operated locking device may be activated to lock the at least one door when the predetermined condition of the vehicle is satisfied after the closure of the vehicle-operator's door.

(10) An automatically controlled door-locking system according to the above mode (9), wherein the locking-device controller includes a portion operable after the vehicle-operator's door is closed, to establish a door locking standby mode in which the power-operated locking device is operated to lock the at least one door when the predetermined condition is satisfied.

In the door-locking system according to the above mode (9), the door locking standby mode is established by the locking-device controller when the vehicle-operator's door has been closed after said identifier represented by said identifier signal matches said identifier of the vehicle. In the door locking standby mode, the power-operated locking device is operated to lock the at least one door when the predetermined condition is satisfied.

(11) An automatically controlled door-locking system according to the above mode (9) or (10), further comprising:

a second communication device including a second identifier-signal requesting device for transmitting the request signal to the portable unit, and a second signal-receiving device for receiving the identifier signal transmitted from the portable unit, the second communication device being capable of communicating with the portable unit while the portable unit is located within a first area whose major part lies within the vehicle;

a third communication device operable including a third identifier-signal requesting device for transmitting the request signal to the portable unit, and a third signal-receiving device for receiving the identifier signal transmitted from the portable unit, the third communication device being capable of communicating with the portable unit while the portable unit is located within a second area whose major part is outside the vehicle, and wherein the locking-device controller comprises:

a first portable-unit detecting device for determining whether the portable unit is located within the first area, depending upon whether an identifier represented by the second identifier signal received by the second signal-receiving device of the second communication device matches the identifier of the vehicle;

a second portable-unit detecting device for determining whether the portable unit is located within the second area, depending upon whether an identifier represented by the identifier signal received by the third signal-receiving device of the third communication device matches the identifier of the vehicle, the locking-device controller operating the power-operated locking device after the vehicle-operator's door is closed, and (a) when the second portable-unit detecting device determines that the portable unit is held in the second area for more than a predetermined time while the second portable-unit detecting device determines that the portable unit is not located within the first area, or (b) when the first and second portable-unit detecting devices determine that the portable unit is not located in either of the first and second areas.

In the case of (a), the portable unit is held located in the second area (whose major part is outside the vehicle) for more than the predetermined time while the portable unit is not located in the first area (whose major part is located within the vehicle). In this case, the power-operated locking device is operated to lock the at least one door of the vehicle. Accordingly, the at least one door is locked where the vehicle operator carrying the portable unit is located outside the vehicle but is relatively near the vehicle, for more than the predetermined time. In the case of (b), the portable unit is located in neither the first area nor the second area. In this case, too, the locking device is operated. Accordingly, the at least one door is locked even where the vehicle operator who has got off the vehicle quickly swings the once opened vehicle-operator's door back to the closed position and swiftly moves away from the vehicle to a location outside the second area. In both cases (a) and (b), the portable unit is not located within the first area whose major part is within the vehicle. Namely, the at least one door is not locked as long as the portable unit is left within the vehicle.

The first and second areas indicated above are the areas A and B shown in FIG. 2, respectively. In the above case (a) where the portable unit is located in the second area B and is not located in the area A, the portable unit is located in an area C, which is a part of the second area B which does not lie within the area A. In the conventional door-locking system, the doors are not locked by the locking device where the portable unit is located in the area C. In the door-locking system according to the above-indicated mode (11), the at least one door is locked when the predetermined time has passed after the moment of determination that the portable unit is located in the area C. Thus, the present automatically controlled door-locking system has an improved operating reliability.

The first and second portable-unit detecting devices are operated in the door locking standby mode, which is established after the locking-device controller determines that the identifier signal received by the first signal-receiving device of the first communication device upon detection of the symptom of the vehicle operator's intention of getting off the vehicle matches the vehicle identifier, and after the vehicle-operator's door is closed. A control program executed in the door locking standby mode may be formulated to be executed following a control program for determining whether the identifier signal received upon detection of the above-indicated symptom matches the vehicle identifier.

The second and third communication devices which are operated in the door locking standby mode may be separate from or independent of the first communication device which is operated upon detection of the above-indicated symptom. Alternatively, at least one of the second and third communication devices may serve as the first communication device which is operated upon detection of the above-indicated symptom.

(12) An automatically controlled door-locking system according to any one of the above modes (1)–(11), further comprising:

getting-off detecting means for detecting a high probability that the operator of the vehicle has got off the vehicle; and a fourth communication device operable upon detection of the high probability by the getting-off detecting means and capable of communicating with the portable device while the portable unit is located within a predetermined area, the fourth communication device including a fourth identifier-signal requesting device for transmitting the request signal, and a fourth signal-receiving device for receiving the identifier signal transmitted from the portable unit;

and wherein the locking-device controller includes:

a third portable-unit detecting device for determining whether the portable unit is located within the predetermined area of the fourth communication device, depending upon whether an identifier represented by the identifier signal received by the fourth signal-receiving device matches the identifier of the vehicle; and control means operable when the identifier represented by the identifier signal received by the first signal-receiving device of the first communication device matches the identifier of the vehicle, to operate the power-operated locking device after the third portable-unit detecting device has determined that the portable unit is not located within the predetermined area of the fourth communication device.

In the door-locking system according to the above mode (12), the control means operates the power-operated locking device to lock the at least one door, when the vehicle is identified by the identifier signal received by the first signal-receiving device of the first communication device operable upon detection of the symptom indicating that the vehicle operator has an intention of getting off the vehicle, even if the portable unit is not detected in the communication area of the fourth communication device operated upon detection of a high probability that the vehicle operator has got off the vehicle. Accordingly, the at least one door is locked even where the vehicle-operator's door is quickly swung to the closed position by the operator in the process of swiftly moving away from the vehicle.

The control means of the locking-device controller may activate the locking device soon after the third portable-unit detecting device has determined that the portable unit is not detected in the communication area of the fourth communication device operated upon detection of the high probability of the operator's getting off the vehicle. Alternatively, the control means may activate the locking device when a predetermined condition as described above with respect to the above modes (9)–(11) is satisfied after the determination that the portable unit is not detected in the communication area of the fourth communication device. The above-indicated determination by the third portable-unit detecting device may be the one as effected in the door locking standby mode established after the vehicle-operator's door is closed, as described above with respect to the above mode (10). Alternatively, the determination may be made before the door locking standby mode is established.

(13) An automatically controlled door-locking system according to the above mode (12), wherein the locking-device controller includes a data memory for storing data indicative of a determination that the identifier represented by the identifier signal received by the first signal-receiving device of the first communication device matches the identifier of the vehicle, the system further comprising an indicator operable when the third portable-unit detector device has determined that the portable unit is not located within the predetermined communication area of the fourth communication device, the indicator providing an indication that the identifier represented by the identifier signal received by the first signal-receiving device matches the identifier of the vehicle.

In the door-locking system according to the above-indicated mode (12), the control means activates the locking device when the portable unit is detected in the communication area of the first communication device upon detection of the symptom indicating that the vehicle operator has an intention of getting off the vehicle, even if the portable unit is not detected upon detection of the high probability that the vehicle operator has got off the vehicle. In the system according to the above mode (13) wherein the indicator is operated when the portable unit is not detected upon detection of the above-indicated high probability, the vehicle operator can know that the locking device is operated. Thus, the indicator may be considered to inform the vehicle operator that the locking device is automatically operated to lock the at least one door.

(14) An automatically controlled door-locking system for automatically locking at least one door of a vehicle, which includes a vehicle-operator's door provided for an operator of the vehicle, the door-locking system comprising:

a power-operated locking device including a power source, and an actuator operated by the power source for selectively locking and unlocking the at least one door placed in a closed position thereof;

a symptom-detecting device operable to detect a symptom indicating that the operator has an intention of getting off the vehicle;

a portable unit to be carried by the operator of the vehicle;

a first communication device operable to communicate with the portable unit while the portable unit is located within a predetermined first area, the first communication device including a first identifier-signal requesting device and a first signal-receiving device, the first identifier-signal requesting device being operable, upon detection of the symptom by the symptom detecting device, to transmit to the portable unit a request signal requesting the portable unit to transmit back to the first signal-receiving device an identifier signal representative of an identifier identifying the portable unit;

getting-off detecting means for detecting a high probability that the operator of the vehicle has got off the vehicle;

a fourth communication device operable upon detection of the high probability by the getting-off detecting means and capable of communicating with the portable device while the portable unit is located with a predetermined second area, the fourth communication device including a fourth identifier-signal requesting device for transmitting the request signal, and a fourth signal-receiving device for receiving the identifier signal transmitted from the portable unit; and a locking-device controller including (a) a first portable-unit detecting device for determining whether the portable unit is located within the predetermined first area of the first communication device, depending upon whether an identifier represented by the identifier signal received by the first signal-receiving device matches the identifier of the vehicle, and (b) a second portable-unit detecting device for determining whether the portable unit is located within the predetermined second area of the fourth communication device, depending upon whether an identifier represented by the identifier signal received by the fourth signal-receiving device matches the identifier of the vehicle, the locking-device controller operating the power-operated locking device to lock the at least one door of the vehicle, on the basis of at least one of output signals of the first and second portable-unit detecting devices.

In the door-locking system according to the above mode (14), the locking device is controlled on the basis of at least one of the output signals of the first and second portable-unit detecting devices, which are operated upon detection of the above-indicated symptom and upon detection of the above-indicated high probability, respectively. This arrangement which may use the output signals of both of the first and second portable-unit detecting devices assures higher degrees of reliability and adequacy of control of the power-operated locking device, than the system which uses only one of those output signals. In particular, the system adapted to control the locking device on the basis of the output signals of the first and second portable-unit detecting devices permits accurate detection of the locations when the above-indicated symptom and high probability are detected, leading to further improved reliability and adequacy of control of the locking device by the locking-device controller.

The above-indicated predetermined first and second communication areas of the first and fourth communication devices may or may not be the same. However, the locking device can be more adequately controlled where the first and second communication areas are different from each other. It is noted that the technical feature according to any one of the above-described modes (1)–(13) of the invention is applicable to the door-locking system according to the above mode (14).

For instance, the locking-device controller may include (a) locking determining means for determining, on the basis of the output signals of the first and second portable-unit detecting devices, whether the locking device should be operated to lock the at least one door, and (b) standby-mode establishing means for establishing the above-indicated door locking standby mode when the locking determining means has determined that the locking device should be operated. Alternatively, the locking-device controller may include (a) the above-indicated locking determining means and (c) locking means for operating the locking device to lock the at least one door when the locking determining means has determined that the locking device should be operated.

(15) Automatically controlled door-locking system according to the above mode (14), wherein each of at least one of the first and fourth communication devices is a communication device capable of communicating with the portable unit in a plurality of predetermined different communication areas, and wherein each of at least one of the first and second portable-unit detecting devices which corresponds to the at least one of the first and fourth communication devices is a portable-unit detecting device capable of detecting the portable unit in the plurality of predetermined different communication areas, respectively.

The communication device capable of communicating the portable unit in the different communication areas may include a selectively operated identifier-signal requesting device which is selectively placed in different modes for transmitting the request signal to the portable unit in the respective different communication areas. Alternatively, the same communication device may include a selectively operated signal-receiving device which is selectively placed in different modes for receiving the identifier signal transmitted from the portable unit in the respective different communication areas. The selectively operated identifier-signal requesting device and the selectively operated signal-receiving device may use a directional antenna whose orientation is changeable to change its directivity. The communication device capable of communicating with the portable unit in the respective different communication areas may include a plurality of communication devices capable of communicating with the portable unit in the respective different communication areas. Where the plurality of communication devices are identical with each other, these communication devices are located at respective different positions on the vehicle, so that the communication devices can communicate with the portable unit in the respective different communication areas.

(16) An automatically controlled door-locking system for automatically locking at least one door of a vehicle, which includes a vehicle-operator's door provided for an operator of the vehicle, the door-locking system comprising:

a power-operated locking device including a power source and an actuator operated by the power source for selectively locking and unlocking the at least one door placed in a closed position thereof;

a portable unit to be carried by the operator;

a communication device including an identifier-signal requesting device and a signal-receiving device, the identifier-signal requesting device being operable to transmit to the portable unit a request signal requesting the portable unit to transmit back to the signal-receiving device an identifier signal representative of an identifier identifying the portable unit, the communication device being capable of communicating with the portable unit in a plurality of different communication areas; and a locking-device controller including a portable-unit detecting device for determining whether the portable unit is located within each of the plurality of different communication areas, by determining whether the identifier represented by the identifier signal received by the signal-receiving device matches an identifier identifying the vehicle, the locking-device controller operating the power-operated locking device to lock the at least one door of the vehicle, on the basis of results of determinations by the portable-unit detecting device as to whether the portable unit is located within at least two areas of the plurality of different communication areas.

In the door-locking system according to the above mode (16) wherein the portable-unit detecting device is adapted to determine whether the portable unit is located within each of a plurality of different communication areas, the location of the portable unit can be detected with high accuracy and reliability, so that the power-operated locking device can be controlled with high degrees of adequacy and reliability, for automatic locking of the vehicle doors as needed.

For instance, the locking-device controller stores in a memory control patterns for the locking device, in relation to respective different combinations of the results of the determinations by the portable-unit detecting device as to whether the portable unit is located within the different areas. An example of such control patterns will be further explained.

The communication device may include an internal communication device capable of communicating with the portable unit located within a first area A whose major part lies within the body of the vehicle, as shown in FIG. 2, and an external communication device capable of communicating with the portable unit located within a second area B whose major part is outside the vehicle body, as also shown in FIG. 2. In this case, there are the following four combinations of the results of the determinations by the portable-unit detecting device in relation to the first and second areas A, B.

1) The portable unit is located within the first area A, but is not detected within the second area B.

In this case, the locking device is not operated to lock the at least one door of the vehicle, since the locking of the door is not usually necessary while the portable unit normally carried by the vehicle operator is located within the vehicle. Where the portable unit remains within the vehicle while the vehicle operator is outside the vehicle (and outside the second area B), the vehicle operator would be "locked out" if all of the doors were locked.

2) The portable unit is not detected within the first area A, but is detected within the second area B.

In this case, the locking device is operated to lock the at least one door, since the portable unit is highly probably located within the part C of the second area B, which part C is not located within the first area A and is relatively distant from the vehicle, so that the at least one door is desirably locked.

3) The portable unit is detected within both of the first and second areas A, B.

In this case, the locking device is not operated to lock the at least one door, since the portable unit is located within the overlapping part D of the first and second areas A, B. The overlapping part D consists of a region within the vehicle and a region which is outside the vehicle but is relatively near the vehicle. In this case, therefore, the at least one door should not necessarily be locked.

4) The portable unit is not detected within either of the first and second areas A, B.

In this case where the portable unit is presumably located in the area E outside the first and second areas A, B, the locking device is operated to lock the at least one door, since the locking of the door is required since the vehicle operator is highly probably at a location considerably distant from the vehicle.

In the conventional door-locking system, the locking device is not operated to lock the at least one door, where the portable unit is not located within the second area B, as in the above-indicated case 4) where the portable unit is presumed to be located in the area E. In the system according to the above mode (16), the at least one door is locked in the case 4). While the conventional system is arranged such that the at least one door is not locked where the portable unit is detected in the second area B as in the cases 2) and 3), the present system is arranged to lock the at least one door where the portable unit is located outside the vehicle but is considerably near the vehicle, namely, in the case 3), and where the portable unit is considerably distant from the vehicle, namely, in the case 2). This arrangement improves the reliability of the door-locking system.

In the specific example of FIG. 2, the plurality of different communication areas within which the portable unit is communicable with the communication device consists of the first and second areas A and B. However, the plurality of different communication areas may consist of a plurality of areas which include different parts of one of the first and second areas A and B. The identifier-signal requesting device of the communication device may be adapted to be operable upon detection of a symptom indicating that the vehicle operator has an intention of getting off the vehicle, or upon detection that the vehicle operator has got off the vehicle, more precisely, upon detection of a high probability that the vehicle operator has got off the vehicle. The technical feature according to any one of the above modes (1)–(15) is applicable to the system according to the mode (16). (17) An automatically controlled door-locking system according to the above mode (16), wherein the communication device includes a plurality of specific-area communication devices capable of communicating with the portable unit located in respective different specific communication areas;

the identifier-signal requesting device of each of at least one of the plurality of specific-area communication devices being operable to transmit the request signal upon detection of a symptom indicating that the operator of the vehicle has an intention of getting off the vehicle, and wherein the locking-device controller controls the power-operated locking device on the basis of results of determinations by the portable-unit detecting device as to whether the portable unit is located within each of at least two areas of the different specific communication areas, which at least two areas include at least one of the different specific communication areas within which the portable unit is communicable with the at least one of said plurality of specific-area communication devices whose identifier-signal requesting device is operable upon detection of said symptom.

In the system according to the above mode (16), the results of the determinations as to whether the portable unit is located in each of at least two specific communication areas include a result of the determination effected upon detection of the symptom indicating that the vehicle operator has an intention of getting off the vehicle. Accordingly, the locking device can be controlled with higher reliability owing to intricate detection of the location of the portable unit with respect to the moment of detection of the above-indicated detection.

For instance, one of the plurality of specific-area communication devices may be an internal communication device capable of communicating with the portable unit within the first area A, while another of the specific-area communication devices may be an external communication device capable of communicating with the portable unit within the second area B. The signal-identifier requesting devices of these internal and external communication devices may be adapted to transmit the request signal while the vehicle-operator's door is in the closed position. In this instance, there are the following two cases:

1) The portable unit is not detected within either of the first and second areas A and B (and is presumed to be located in the area E), and the identifier represented by the identifier signal received upon detection of the above-indicated symptom matches the identifier of the vehicle.

In this case, the locking device is operated to lock the at least one door. Once the identifier signal received upon detection of the symptom identifies the vehicle in question, the at least one door may be desirably locked since the non-detection of the portable unit in the first and second areas usually results from the presence of the portable unit in the area E outside the areas A and B.

2) The portable unit is not detected in either of the first and second areas A, B and is presumed to be in the area E, and the identifier represented by the identifier signal received upon detection of the above-indicated symptom does not identify the vehicle.

In this case, the portable unit is considered to be defective or inoperable for some reason or other such as exhaustion of a battery incorporated therein, indicating a high possibility that the portable unit fails to transmit the identifier signal. In this case, the locking-device controller may activate a suitable alarm indicator.

The at least one specific-area communication device may be a device capable of communicating with the portable unit located within at least one of the first and second areas A, B, or within any other specific communication area the second area B.

(18) An automatically controlled door-locking system according to the above mode (16) or (17), wherein the locking-device controller includes an abnormality detecting device which detects an abnormality of the portable unit if the portable-unit detecting device determines that the portable unit is located within none of the at least two areas of the plurality of different communication areas. plurality of different communication areas, the portable unit may be considered defective or abnormal. For improved accuracy of detection of the abnormality of the portable unit, it is desirable to take into account the result of the determination effected based on the identifier signal received upon detection of the above-indicated symptom.

(19) A control system provided on a vehicle, for controlling a state of the vehicle on the basis of a result of determination as to whether an identifier represented by an identifier signal received from a portable unit to be carried by an operator of the vehicle matches an identifier identifying the vehicle, the control system comprising:

a symptom detecting device operable to detect a symptom indicating that the operator of the vehicle has an intention of getting off the vehicle; and an identifier-signal requesting device operable upon detection of the symptom by the symptom detecting device, to transmit to the portable unit a request signal requesting the portable unit to transmit the identifier signal.

In the vehicle state control system according to the above mode (19), the state of the vehicle is controlled on the basis of a result of determination as to whether the identifier represented by the identifier signal received from the portable unit upon detection of a symptom indicating that the vehicle operator has an intention of getting off the vehicle matches the identifier identifying the vehicle in question. The present vehicle state control system can control not only the operating state of the door locking device of the vehicle, but also other states of the vehicle, such as the operating state of a drive device of the vehicle. Where the present vehicle state control system is applied to control the vehicle drive device, a desired control of the vehicle drive device is performed in the above-indicated case 1) wherein the portable unit is detected in the first area A but is not detected in the second area B), or in the case 3) wherein the portable unit is detected in both of the first and second areas A, B). For instance, the vehicle state control system is adapted to establish a start standby mode in which the drive device is made ready for starting the vehicle. Namely, there is a high probability that the vehicle is started to run, where the vehicle operator is located within the vehicle body or outside but near the vehicle.

The technical feature according to any one of the above-indicated modes (1)–(18) of the present invention is applicable to the vehicle state control system according to the above mode (19).

(20) A portable-unit detecting system communicable with a portable unit to be carried by an operator of a vehicle, for determining whether said portable unit is located within a predetermined communication area, said portable-unit detecting system comprising:

a symptom detecting device operable to detect a symptom indicating that the operator of the vehicle has an intention of getting off the vehicle;

a communication device operable to communicate with said portable unit while said portable unit is located within a predetermined communication area, said communication device including an identifier-signal requesting device and a signal-receiving device, said identifier-signal requesting device being operable, upon detection of said symptom by said symptom detecting device, to transmit to said portable unit a request signal requesting said portable unit to transmit to said signal-receiving device an identifier signal identifying said portable unit; and portable-unit detecting means for determining whether said portable unit is located within said predetermined communication area, on the basis of a result of determination as to whether an identifier represented by the identifier signal received by the signal-receiving device of the communication device matches an identifier identifying the vehicle.

The technical features according to any one of the above modes (1)–(19) is applicable to the portable-unit detecting system according to the above mode (20). (21) An automatically controlled door-locking system for automatically locking at least one door of a vehicle, which includes a vehicle-operator's door provided for an operator of the vehicle, the door-locking system comprising:

a power-operated locking device including a power source and an actuator operated by the power source for selectively locking and unlocking the at least one door placed in a closed position thereof;

a communication device operable to communicate with the portable unit while the portable unit is located within a predetermined communication area, the communication device including an identifier-signal requesting device and a signal-receiving device, the signal-identifier requesting device being operable to transmit to the portable unit a request signal requesting the portable unit to transmit back to the signal-receiving device an identifier signal representative of an identifier identifying the portable unit; and a locking-device controller, operable upon detection of said symptom by said symptom detecting device, to operate the power-operated locking device to lock the above-indicated at least one door when said identifier represented by said identifier signal received by said signal-receiving device matches an identifier identifying the vehicle.

In the present automatically controlled door-locking system, the power-operated locking device is controlled on the basis of a result of determination as to whether the identifier represented by the identifier signal received by the signal-receiving device upon detection of the above-indicated symptom matches the vehicle identifier. The communication device may be adapted to keep transmitting the request signal, so that the identifier signal received by the communication device upon detection of the symptom is used by the locking-device controller.

The technical feature according to any one of the above modes (1)–(20) is applicable to the door-locking system according to the above mode (21).

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIG. 9 is a view showing a relationship between three control modes and five states of the door-locking system and, which relationship is stored in the ROM;

DETAILED DESCRIPTION OF THE PREFERRED EMBODIMENTS

Referring to FIGS. 1–10, there is shown a vehicle state control system in the form of an automatically operated and controlled door-locking system for an automotive vehicle, which is constructed according to one embodiment of this invention.

Figure 1:
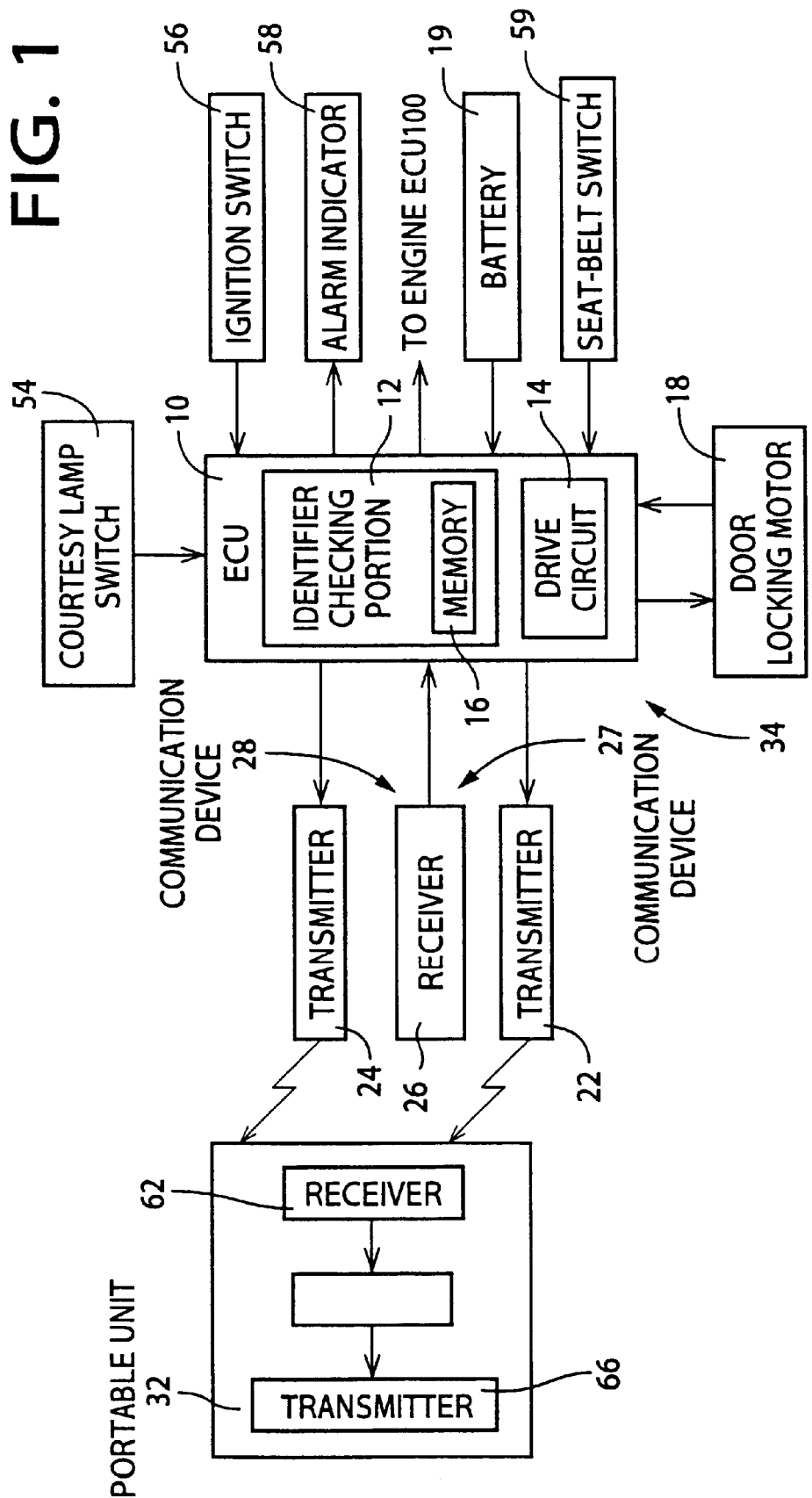
FIG. 1 is a block diagram showing a general arrangement of an automatically controlled door-locking system for an automotive vehicle, which is constructed according to one embodiment of the present invention.
Figure 2:
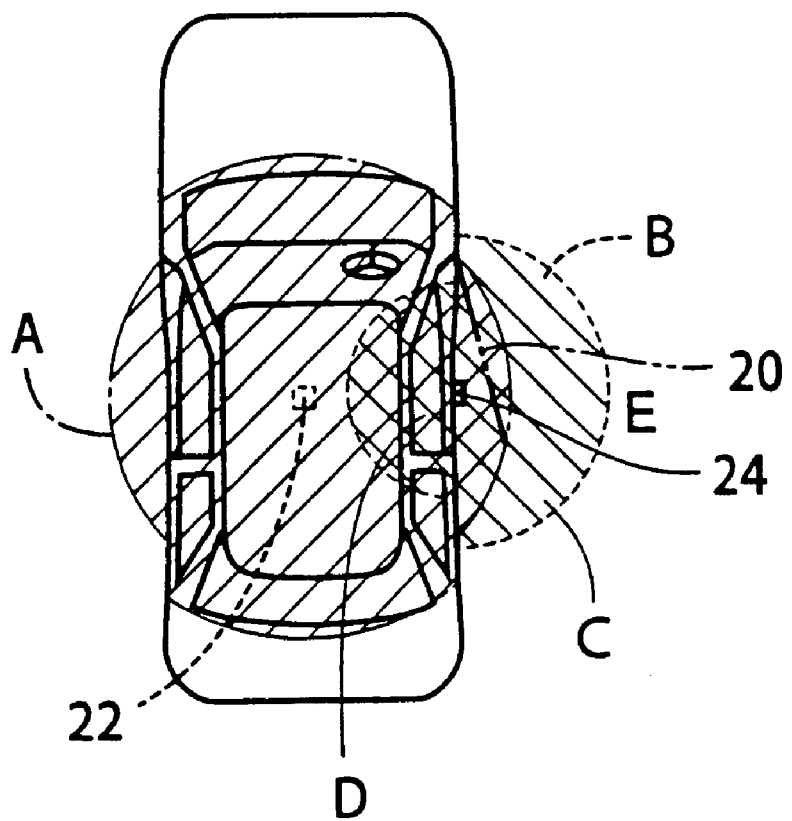
FIG. 2 is a view indicating areas in which communication devices of the door-locking system are capable of communicating with a portable unit.

In FIGS. 1 and 2, reference numeral 10 denotes a door-locking controller in the form of an electronic control unit (ECU) provided on the automotive vehicle. The ECU 10 includes an identifier checking portion 12 and a driver circuit 14. The identifier determining portion 12, which is constituted principally by a computer, incorporates a memory 16 provided for storing various data communication control programs and various kinds of data obtained by processing input signals. The driver circuit 14 is connected to an actuator in the form of a door locking motor 18 and a power source in the form of a battery 19, and includes a switching device which is adapted to operate the door locking motor 18 in an appropriate one of forward and reverse directions. The motor 18 is operated in the forward direction to lock a door 20 of the vehicle in its closed position, and is operated in the reverse direction to unlock the door 20. As indicated in FIG. 2, the door 20 is a front right door which is provided adjacent to a vehicle operator's seat, as an entrance and an exit for permitting the vehicle operator to enter and leave an operator's compartment of the vehicle.

To the ECU 10, there are connected two transmitters 22 and 24 and one receiver 26. The transmitter 22 is disposed in an almost central part of the operator's compartment, namely, adjacent to a center console, as indicated in FIG. 2. The other transmitter 24 is embedded in a door knob provided on the outer surface of the door 20 such that the transmitter 24 is exposed in the outer surface of the door knob. The receiver 26 is provided to receive identifier signals transmitted from a portable unit 32 (described below) in respective two different communication areas A and B (indicated in FIG. 2) within which the respective two transmitters 22, 24 are capable of communicating with the portable unit 32. The receiver 26 is positioned such that it is able to receive the identifier signals (described below) transmitted from either of the two areas A and B.

It will be understood that the transmitter 22 and the receiver 26 constitute a communication device 27 for detecting the portable unit 32 within the first area A, while the transmitter 24 and the receiver 26 constitute a communication device 28 for detecting the portable unit 32 within the second area B.

Each of the transmitters 22, 24 is adapted to transmit a request signal requesting the portable unit 32 to transmit an identifier signal, and the receiver 26 receives the identifier signal transmitted from the portable unit 32. The identifier checking portion 12 of the ECU 10 checks the identifier signal to determine whether an identifier represented by the identifier signal identifies the vehicle, namely, whether the identifier identifying the portable unit 32 matches an identifier of the vehicle. In the present embodiment, this determination is made by determining whether the identifier represented by the received identifier signal is the same as the identifier of the vehicle. Based on a result of the checking or determination by the identifier checking portion 12, the ECU 10 controls the driver circuit 13 to control the operating state of the door locking motor 18, more specifically, to hold the closed door 20 in the locked or unlocked state.

The communication device 27 is capable of communicating with the portable unit 32 while the portable unit 32 is located within the first area A which covers the vehicle operator's or front compartment and a passenger's or rear compartment of the vehicle, and further covers areas near and external to the front right door 20 and the other three doors of the vehicle, as indicated in FIG. 2. On the other hand, the communication device 28 is capable of communicating with the portable unit 32 while the portable unit 32 is located within the second area B which covers the vehicle operator's seat and an area near and external to the front right door 20, as also indicated in FIG. 2. The first and second areas A and B are determined by the transmitting capacities of the transmitters 22, 24, respectively. The door-locking controller or ECU 10 and the communication devices 27, 28, which are mounted on the vehicle, To are referred to as "vehicle-mounted devices".

Figure 3:
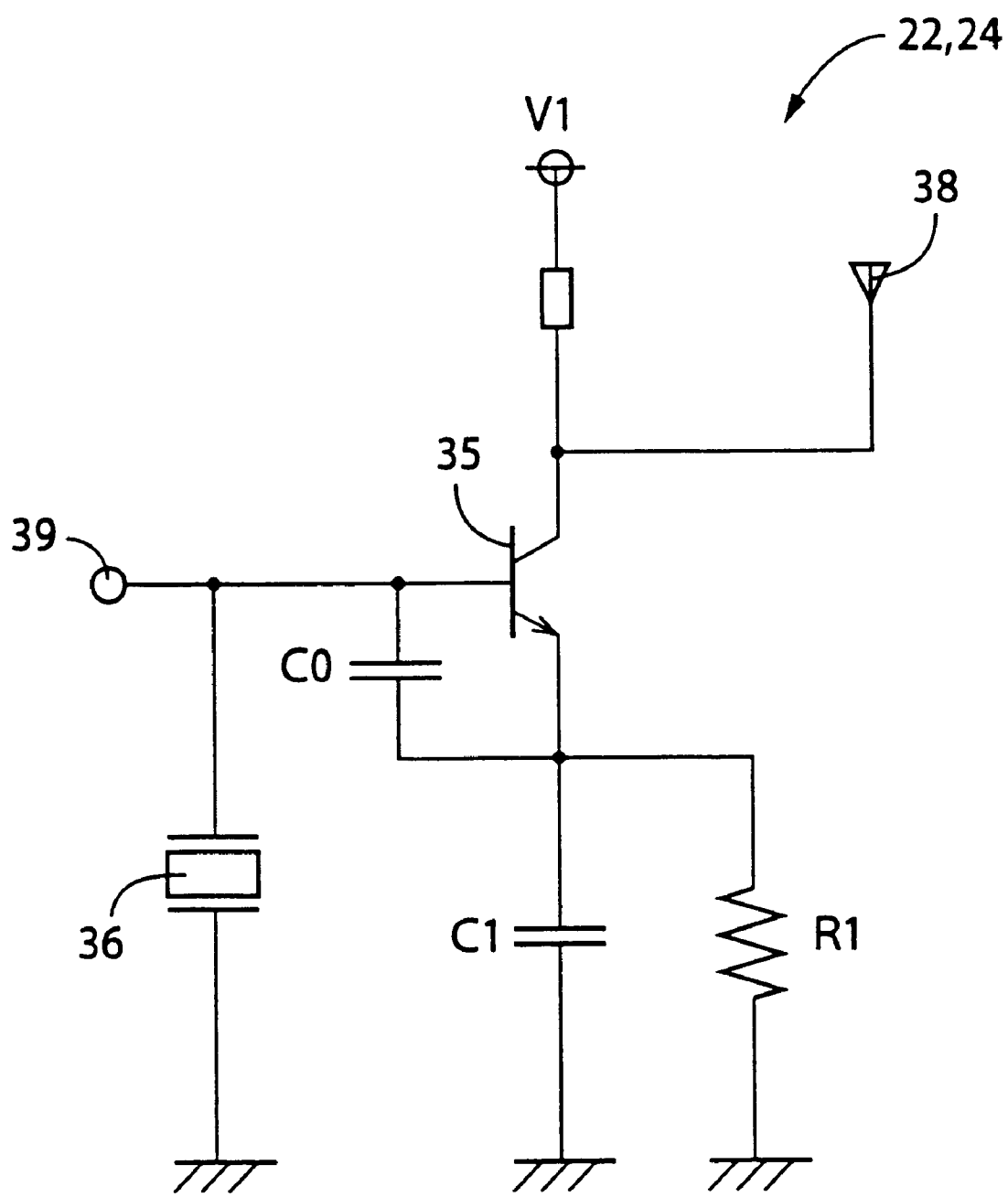
FIG. 3 is a view showing the arrangement of transmitters included in the communication devices.

The transmitters 22, 24 are operated according to control signals received from the ECU 10, to transmit the request signals. An example of the arrangement of each transmitter 22, 24 is illustrated in FIG. 3. The illustrated transmitter includes a transistor 35, an oscillator element 36, and an antenna 38. When an ON signal from the ECU 10 is received as the control signal by a terminal 39 of the transmitter 22, 24, the output signal of the transistor 35 is transmitted as the request signal through the antenna 38. This request signal has a predetermined frequency (134.2 kHz in this specific example), which is determined by the oscillator element 36. When an OFF signal from the ECU 10 is received by the terminal 39, no electric current is applied to the base of the transistor 35.

Figure 4:
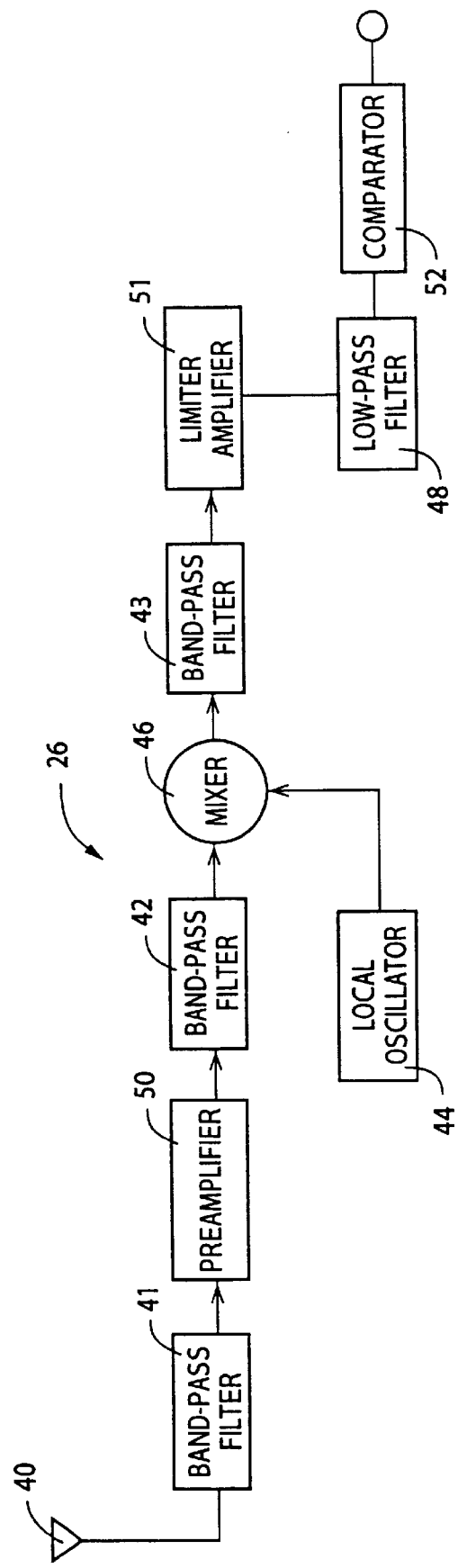
FIG. 4 is a view showing the arrangement of a receiver included in the communication devices.

The receiver 26 is adapted to receive the identifier signal transmitted from the portable unit 32, and provides the ECU 10 with an identifier represented by the identifier signal. An example of the arrangement of the receiver 26 is illustrated in FIG. 4. The illustrated receiver includes an antenna 40, a plurality of band-pass filters 41–43, a local oscillator 44, a mixer 46, a lowpass filter 48, a plurality of amplifiers 50, 51, and a comparator 52. The identifier signal receiver from the antenna 40 is filtered by the band-pass filters 41, 42 and amplified by the preamplifier 50, so that a signal having a predetermined frequency (300 MHz in this specific example) is extracted. The extracted signal is mixed by the mixer 46 with a signal generated by the local oscillator 44, to provide a medium-frequency signal, which is then filtered by the band-pass filter 43 to remove an undesired frequency component. The medium-frequency signal is amplified by the limiter amplifier 51 and is then filtered by the low-pass filter 48 to remove an undesired high-frequency component. The thus obtained signal is compared by the comparator 52 with a reference signal to provide a digital signal indicative of a result of the comparison. This digital signal is applied to the ECU 10.

To the ECU 10, there are further connected a courtesy lamp switch 54, an ignition switch 56, an alarm indicator 58, and a seat-belt switch 59, which are provided within the operator's compartment. An output signal of the seat-belt switch 59 indicates whether a seat belt is used by the vehicle operator, while an output signal of the courtesy lamp switch 54 indicates whether the door 20 is in the open or closed position. When the ignition switch 56 is off, it generally indicates that the vehicle is standstill and is not likely to be started. The alarm indicator 58 is activated when the receiver 26 does not receive any identifier signal identifying the vehicle, as described below. In the present embodiment, the alarm indicator 58 is disposed within the interior of the vehicle. Where the alarm indicator 58 includes a buzzer, an operation of the buzzer can be heard by the vehicle operator even when the operator is outside the vehicle.

When a change of the output signal of the seat-belt switch 59 indicates that the seat belt which has been used by the operator is released, this shows a high probability that the vehicle operator has an intention of leaving or getting off the vehicle. This high probability is a symptom that the vehicle operator has got off the vehicle. The ignition switch 56 in its OFF state or an opening action of the door 20 in the closed position is also a symptom of the operator's getting-off. On the other hand, a closing action of the door 20 in the open position indicates a high probability that the vehicle operator has got off the vehicle.

The memory 16 includes a ROM, an EEPROM and a RAM. The ROM stores control programs illustrated in the flow charts of FIGS. 6–8 and 10 and control patterns indicated in FIG. 9. The EEPROM stores data necessary to identify the vehicle in question, namely, data necessary to check whether the identifier signal received from the portable unit 32 identifies the vehicle or not. The RAM is used to store data indicative of a result of checking of the identifier signal (more precisely, the above-indicated digital signal received from the comparator 52) by the identifier checking portion 12.

Figure 5:
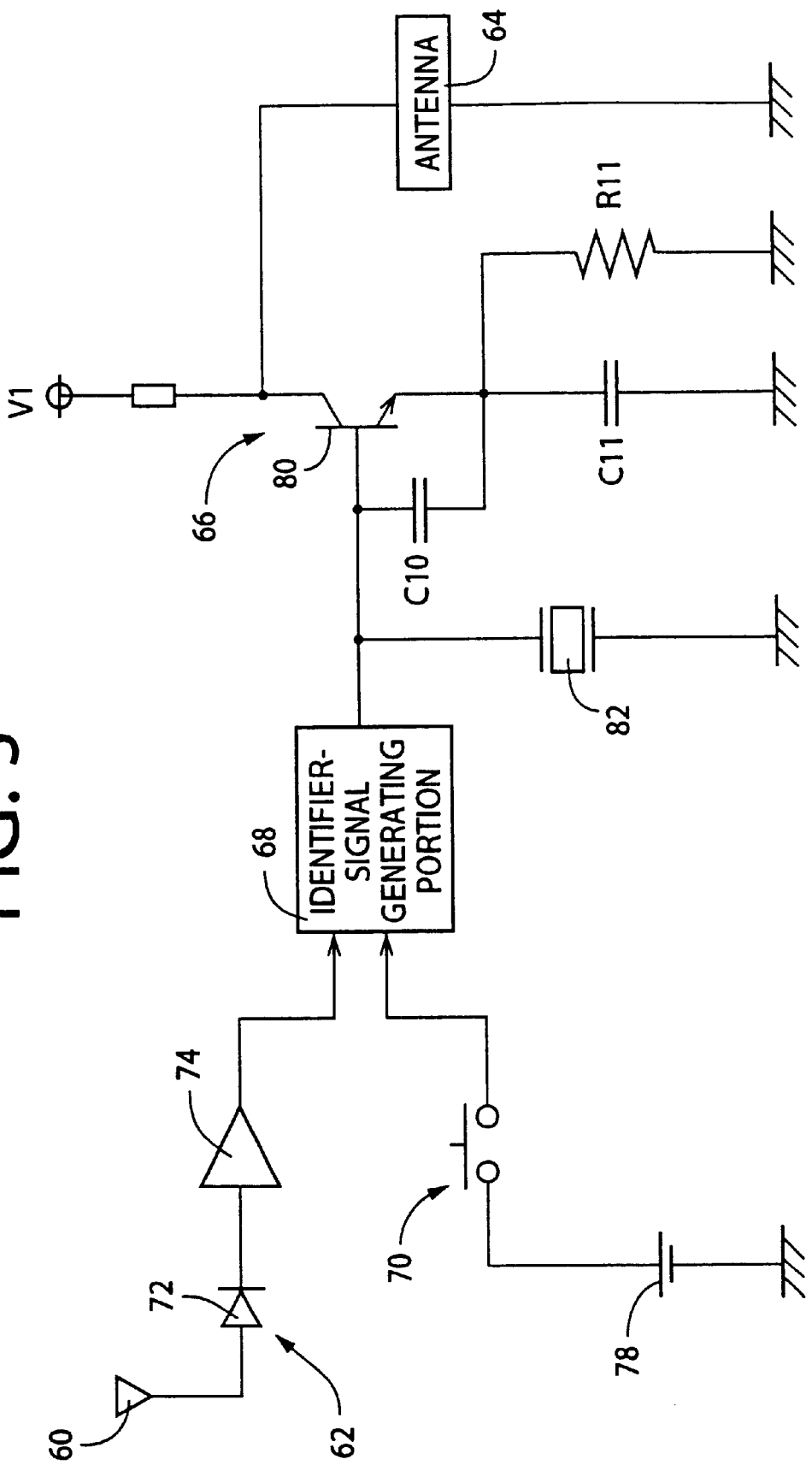
FIG. 5 is a view showing the portable unit which is capable of communicating with the communication devices.

In the present embodiment, the portable unit 32 adapted to transmit the identifier signal also serves as an ignition key for turning on and off the ignition switch 56. Usually, the vehicle operator who has turned off the ignition switch 56 leaves the vehicle with the ignition key. The portable unit 32 is arranged to generate the identifier signal in response to the request signal received from the vehicle-mounted device 34 (transmitter 22 or 24), or by manipulation of the portable unit 32. An example of the arrangement of the portable unit 32 is illustrated in FIG. 5. This portable unit 32 includes a receiver 62 with an antenna 60 for receiving the request signal from the transmitter 22, 24, a transmitter 66 with an antenna 64 for transmitting the identifier signal to the receiver 26, an identifier-signal generating portion 68 and a switch 70, a wave detector 72 and a comparator 74.

The signal received by the antenna 60 of the receiver 62 is processed by the wave detector 72, amplified by an amplifier and compared by the comparator 74 with a reference signal. When the received signal is the request signal having 134.2 kHz transmitted from the transmitter 22, 24, a high-level signal is applied to the identifier-signal generating portion 68, so that the generating portion 68 generates the identifier signal. The frequency of the request signal transmitted from the transmitter 22, 24 is thus checked by the receiver 62, to assure that the portable unit 32 responds to only the request signal that is transmitted to the vehicle whose ignition switch 56 is operable by the portable unit 32.

The switch 70 is a normally open switch, and is closed when it is operated by the vehicle operator (holder of the portable switch 32), so that a high-level signal is applied from a DC power source 78 to the identifier-signal generating portion 68, to generate the identifier signal.

Upon application of the high-level signal to the identifier-signal generating portion 68, a digital control signal ("1" or "0") is applied to the base of a transistor 80 of the transmitter 66. While the high-level signal is held applied to the base of the transistor 80, the output signal of the transistor 80 is transmitted as the identifier signal through the antenna 64. The frequency (300 MHz) of this identifier signal is determined by an oscillator element 82, so that the identifier signal can be received by the receiver 26 of the vehicle-mounted device 34.

The identifier signal transmitted from the transmitter 66 of the portable unit 32 identifies the vehicle. That is, an identifier represented by the identifier signal and identifying the portable unit 32 matches an identifier of the vehicle represented by data stored in the memory 16 of the ECU 10. The identifier checking portion 12 of the ECU 10 checks the received identifier signal to see whether the identifier signal is the one received from the portable unit 32, and is not the one received from a portable unit used for the other vehicles.

There will be described an operation of the automatically operated and controlled door-locking system constructed as described above.

In the present embodiment, the request signal is transmitted from one of the transmitters 22, 24 when a predetermined condition is satisfied. The identifier checking portion 12 determines whether the receiver 26 has received the identifier signal, and further determines whether the identifier represented by the received identifier signal identifies the vehicle, that is, matches the identifier of the vehicle stored in the EEPROM of the memory 16. Based on the result of determination as to whether the received identifier signal identifies the vehicle, the driver circuit 14 is controlled to control the door locking motor 18.

The present embodiment is arranged such that a control signal is applied from the ECU 10 to the transmitter 24 to cause the transmitter 24 to transmit the request signal through the antenna 38, when the door 20 is opened while the ignition switch 56 is in the off state. That is, an opening action or movement of the door 20 after the ignition switch 56 is turned off is considered as a symptom indicating an intention of the vehicle operator of getting off the vehicle. Upon detection of this symptom, the request signal is transmitted from the transmitter 24.

When the identifier signal is received from the receiver 26, the identifier checking portion 12 checks if the received identifier signal is the one received from the portable unit 32 which is used to turn on and off the ignition switch 56 of the vehicle in question, namely, if the received identifier signal identifies the vehicle in question. If the received identifier signal identifies the vehicle, a signal indicative of this fact is stored in the RAM of the memory 16, and the transmitter 24 is commanded to terminate the intermittent transmission of the request signal. The transmitter 24 is commanded to intermittently transmit the request signal at a predetermined time interval, as long as no identifier signal is received by the receiver 26, or as long as the identifier represented by the received identifier signal is different from the identifier of the vehicle.

When the door 20 is closed, the control signal is applied from the ECU 10 first to the transmitter 22 and then to the transmitter 24, to cause the transmitters 22, 24 to transmit the request signals. That is, a closing action or movement of the door 20 from the open position to the closed position indicates a high probability that the vehicle operator has got off or left the vehicle. Upon detection of the closing action, the transmitters 22, 24 are commanded to transmit the request signals.

With the request signal being transmitted from the transmitter 22, 24 as described above, the ECU 10 determines whether the receiver 26 has received an identifier signal and whether the received identifier signal identifies the vehicle.

In the present embodiment, the operating state of the door locking motor 18 is controlled on the basis of both a result of the determination when the door 20 is closed and a result of the determination when the door 20 is opened.

Figure 6:
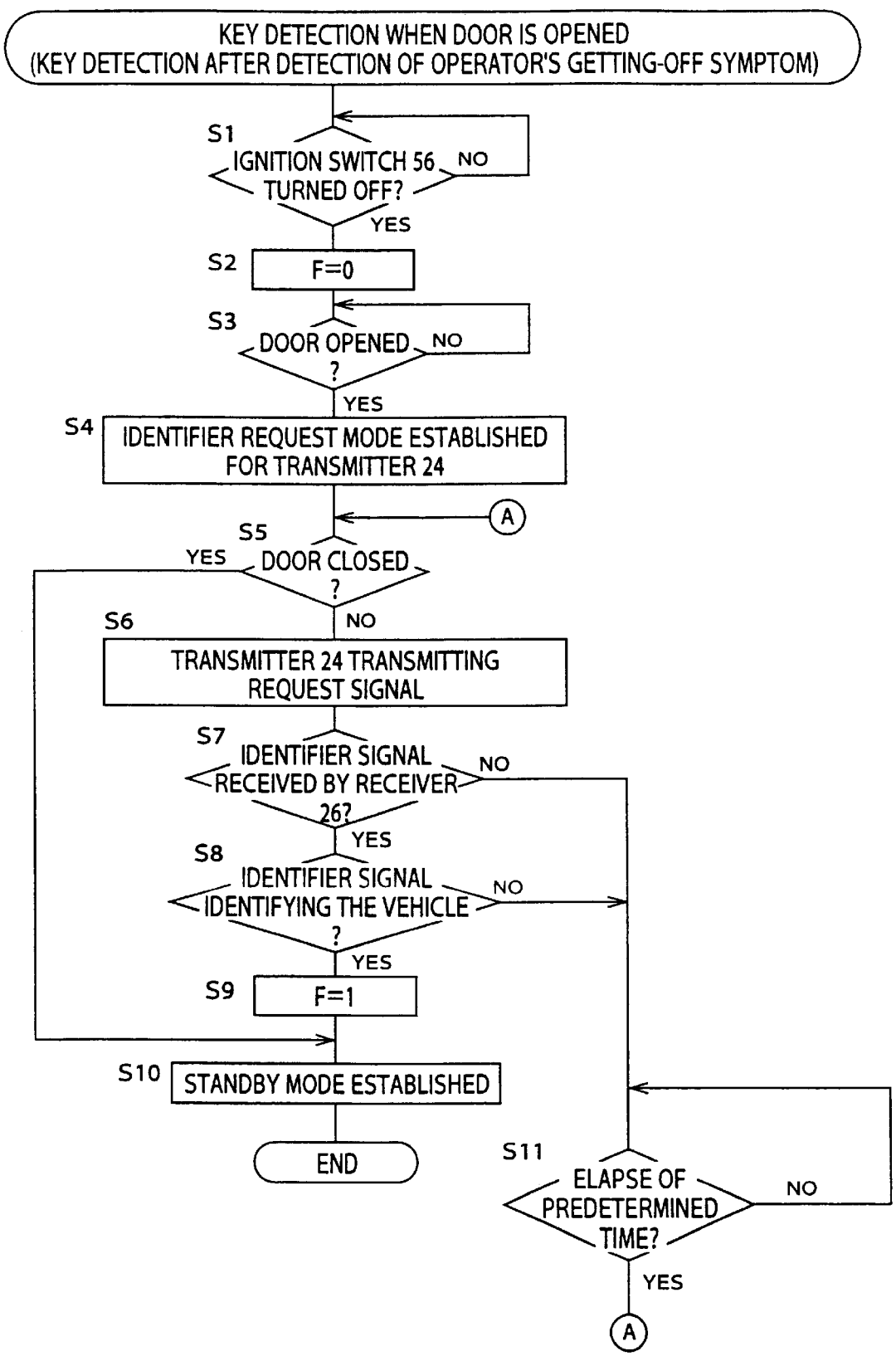
FIG. 6 is a flow chart illustrating a control program stored in a ROM of a door-locking controller, for detecting the portable unit in the form of an ignition key when a door of the vehicle is opened.

Referring to the flow chart of FIG. 6, there is illustrated the control program formulated to detect the ignition key in the form of the portable unit 32 when the door 20 is opened. This control program may be considered to be a program to detect the portable unit 32 after detection of a symptom indicating that the vehicle operator has got off the vehicle.

The control program of FIG. 6 is initiated with step S1 to determine whether the ignition switch 56 has been turned off. If an affirmative decision (YES) is obtained in step S1, the control flow goes to step S2 in which a flag F is reset to "0". Then, step S3 is implemented to determine whether the door 20 has been opened. This determination is made by determining whether the courtesy lamp switch 54 is on or not. When an affirmative decision (YES) is obtained in step S3, the control flow goes to step S4 in which an identifier request mode is established for the transmitter 24 which is capable of communicating with the portable unit 32 in the second area B. In this mode, the transmitter 24 is operated to intermittently transmit the request signal to the portable unit 32, as long as the door 20 is open. Namely, step S4 is followed by step S5 to determine whether the door 20 has been closed. If a negative decision (NO) is obtained in step S5, that is, if the door 20 is kept open, the control flow goes to step S6 in which the ECU 10 commands the transmitter 24 to transmit the request signal requesting the portable unit 32 to transmit the identifier signal.

When a predetermined time has passed after the request signal is transmitted in step S6, the control flow goes to step S7 to determine whether the receiver 26 has received an identifier signal. Step S7 is implemented the predetermined time after the moment of generation of the request signal from the transmitter 24 (vehicle-mounted device 34), so that the portable unit 32 transmits its identifier signal in response to the reception of the request signal and so that the receiver 26 receives the transmitted identifier signal.

If an affirmative decision (YES) is obtained in step S7, the control flow goes to step S8 to determine whether the identifier represented by the identifier signal received by the receiver 26 matches the identifier of the vehicle stored in the memory 16, that is, whether the received identifier signal identifies the vehicle in question. If an affirmative decision (YES) is obtained in step S8, the control flow goes to step S9 to set the flag F to "1", and to step S10 to establish a standby mode. Thus, one cycle of execution of the control program of FIG. 6 is terminated.

If a negative decision (NO) is obtained in either one of steps S7 and S8, the control flow goes to step S11 to determine whether a predetermined time has passed after the request signal has been transmitted to the transmitter 24. When the predetermined time has passed, the control flow goes back to step S5 to determine whether the door 20 is still kept open. Thus, steps S6, S7, S8 and S11 are repeatedly implemented until the affirmative decision (YES) is obtained in both steps S7 and S8. Accordingly, the request signal is intermittently transmitted from the transmitter 24 at a time interval equal to the predetermined time used in step S11.

When the door 20 is closed, an affirmative decision (YES) is obtained in step S5, and the control flow goes directly to step S10 to establish the standby mode, so that the execution of the control program of FIG. 6 is terminated. In this respect, it is noted that the flag F remains to be "0" if the received identifier signal does not identify the vehicle while the request signal is intermittently transmitted, namely, if the receiver 26 has not received the identifier signal from the portable unit 32 corresponding to the vehicle while the door 20 is kept open, that is, before the door 20 is closed.

Figure 7:
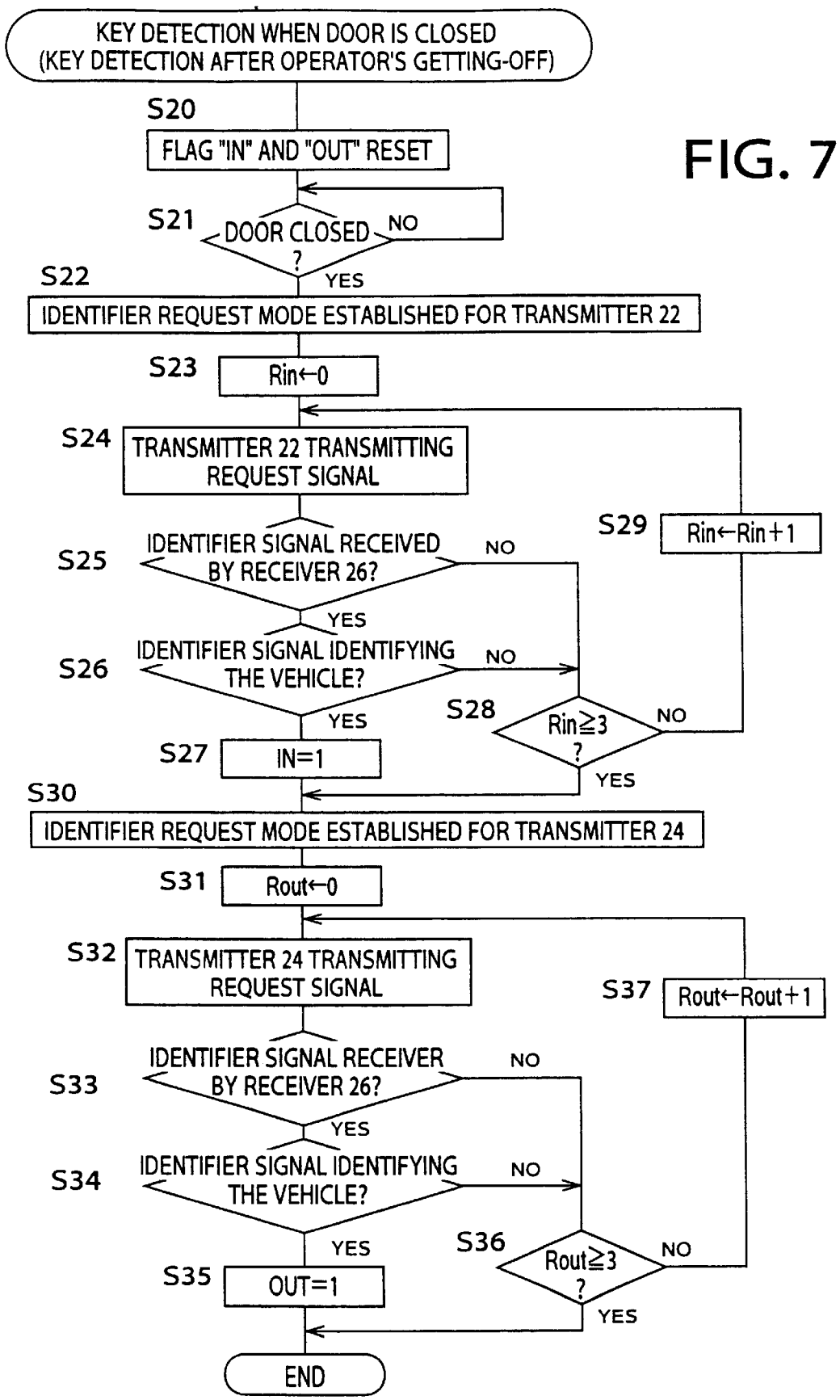
FIG. 7 is a flow chart illustrating a control program also stored in the ROM, for detecting the ignition key when the door is closed.

In the meantime, a control program illustrated in the flow chart of FIG. 7 is executed. This control program is provided to detect the portable unit 32 when the door 20 is closed. The present control program is initiated with step S20 in which a flag IN and a flag OUT are both reset to "0". Step S20 is followed by step S21 to determine whether the door 20 has been closed. If an affirmative decision (YES) is obtained in step S21, the control flow goes to step S22 in which an identifier request mode is established for the transmitter 22 which is capable of communicating with the portable unit 32 in the first area A. As described above, the closing action of the door 20 indicates a high probability that the vehicle operator has got off or left the vehicle. Based on this fact, step S22 and the subsequent steps are implemented upon closing of the door 20, to proceed with a further analysis as to whether the vehicle operator has actually got off the vehicle. In this respect, the control program of FIG. 7 is considered to be a program for detecting the portable unit 32 after the detection of the operator's getting-off.

Step S22 is followed by step S23 to reset a counter Rin to "0". Then, the control flow goes to step S24 in which the transmitter 22 is operated to transmit the request signal, and then to S25 to determine whether the receiver 26 has received an identifier signal. If an affirmative decision (YES) is obtained in step S25, step S26 is implemented to determine whether the identifier signal received by the receiver 26 identifies the vehicle. If an affirmative decision (YES) is obtained in step S26, the control flow goes to step S27 in which the flag IN is set to "1".

If the receiver 26 has not received an identifier signal or if the received identifier signal does not identify the vehicle, the control flow goes to step S28 to determine whether the count counted by the counter Rin is equal to or larger than "3". If a negative decision (NO) is obtained in step S28, the control flow goes to step S29 to increment the counter Rin, and goes back to step S24.

Thus, the control program of FIG. 7 in the present embodiment is formulated to repeat steps S24–S26 three times for checking whether the receiver 26 has received the identifier signal from the portable unit 32, that is, the identifier signal which identifies the vehicle in question. If an affirmative decision (YES) is not obtained in step S26 within a predetermined time corresponding to the count "3" of the counter Rin, the flag IN remains to be "0", indicating that the portable unit 32 is not located in the first area A.

After the flag IN is set to "1" in step S27, or when an affirmative decision (YES) is obtained in step S28, the control flow goes to step S30 in which the identifier request mode is established for the transmitter 22 capable of communicating with the second area B. Step S30 is followed by step S31 to reset a counter Rout to "0". Then, step S32 is implemented to command the transmitter 24 to transmit the request signal. Step S32 is followed by steps S33–S37 similar to the steps S25–S29 described above. S33 and S34 are provided to determine whether the receiver 26 has received an identifier signal and whether the received identifier signal identifies the vehicle. If an affirmative decision (YES) is obtained in step S34, the control flow goes to step S35 to set the flag OUT to "1". If a negative decision (NO) is obtained in step S33 or S34, the control flow goes to step S36 to determine whether the count counted by the counter Rout is equal to or larger than "3". If a negative decision (NO) is obtained in step S36, the control flow goes to step S37 to increment the counter Rout, and goes back to step S32. Steps S32–S34 are repeated three times to determine whether the portable unit 32 is located within the second area B. If the affirmative decision (YES) is not obtained in step S34 within the predetermined time, the flag OUT remains to be "0", indicating that the portable unit 32 is not located within the second area B.

The driver circuit 14 for driving the door locking motor 28 is controlled on the basis of a result of the determination as to whether the portable unit 32 is detected in the second area B after the door 20 is opened, and results of the determinations as to whether the portable unit 32 is detected in the first area A and as to whether the portable unit 32 is detected in the second area B after the door 20 is closed.

Figure 10:
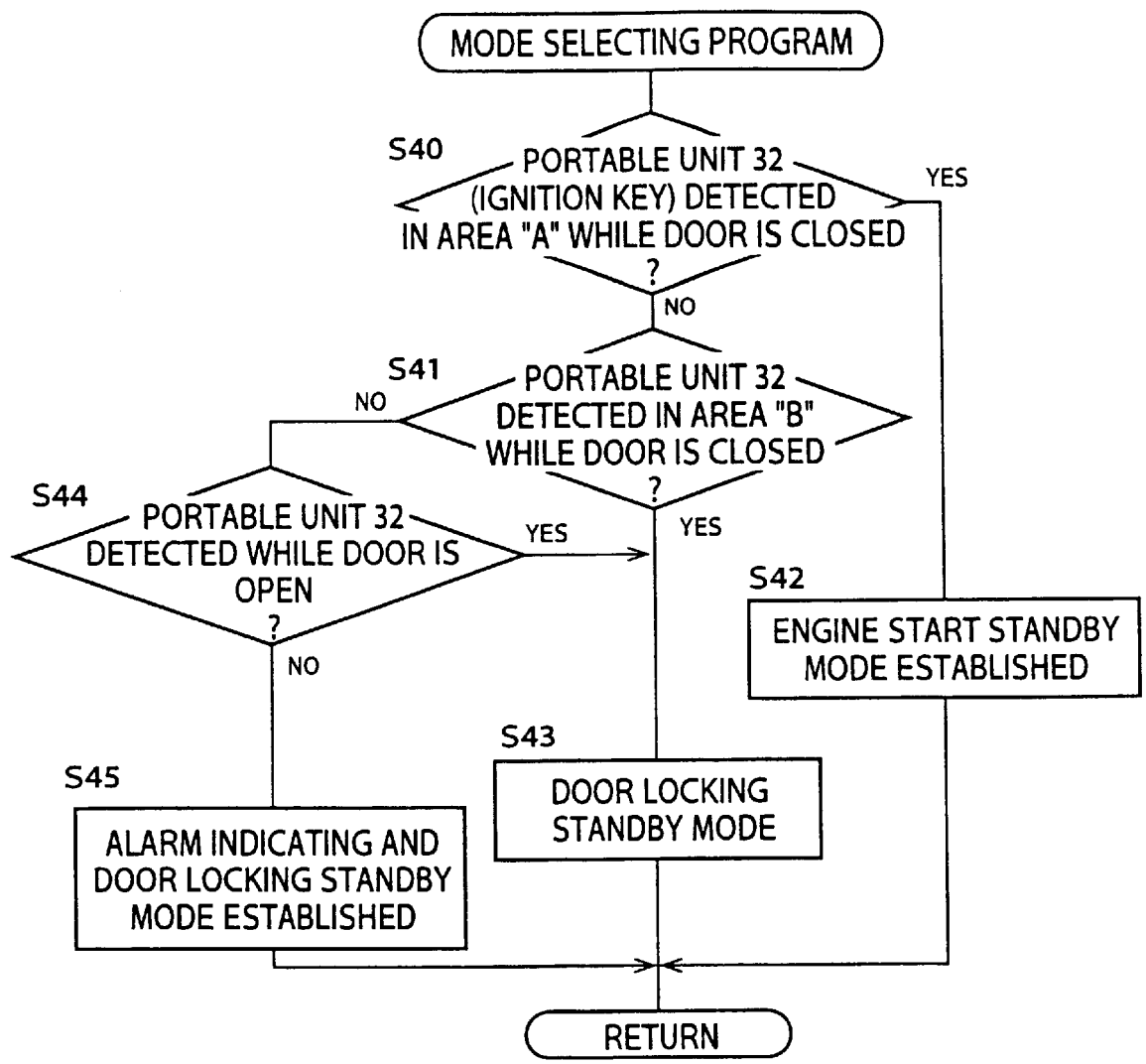
FIG. 10 is a flow chart illustrating a control program stored in the ROM, for selecting a control mode of the locking device.

The present automatically operated and controlled door-locking system is controlled in one of three control modes which is selected according to a mode selecting program illustrated in the flow chart of FIG. 10. The control program of FIG. 10 is initiated with step S40 to determine whether the portable unit 32 is detected in the first area A while the door 20 is closed (after the door 20 has been closed), that is, whether the flag Rin is set at "1". If a negative decision (NO) is obtained in step S40, the control flow goes to step S41 to determine whether the portable unit 32 is detected in the second area B while the door 20 is closed, that is, whether the flag Rout is set at "1". If an affirmative decision (YES) is obtained in step S40, the control flow goes to step S42 to select an ENGINE START STANDBY mode. If an affirmative decision (YES) is obtained in step S41, the control flow goes to step S43 to establish a DOOR LOCKING STANDBY mode. If the negative decision (NO) is obtained in both of steps S40 and S41, the control flow goes to step S44 to determine whether the portable unit 32 is detected in the second area B while the door 20 is open, that is, whether the flag F is set at "1". If an affirmative decision (YES) is obtained in step S44, the control flow goes to step S43 to establish the DOOR LOCKING STANDBY mode. If a negative decision (NO) is obtained in step S44, the control flow goes to step S45 to establish an ALARMING AND DOOR LOCKING STANDBY mode. The three control modes indicated above will be discussed in detail by reference to the table of FIG. 9.

The table of FIG. 9 indicates a relationship between the three control modes and five states (STATES 1–5) of the doorlocking system. The ENGINE START STANDBY mode is selected in step S42 when the system is placed in STATE 1 wherein the portable unit 32 is detected in only the first area A while the door 20 is closed. When the ENGINE START STANDBY mode is selected, the ECU 10 commands an electronic engine control device to establish the ENGINE START STANDBY mode in which an immobilizer is released to cancel the inhibition of ignition of an engine and fuel injection into the engine.

The ENGINE START STANDBY mode is also established in step S42 when the door-locking system is placed in STATE 2 wherein the portable unit 32 is detected in both of the first and second areas A and B while the door 20 is closed. In this case, the portable unit 32 is located in an overlapping part D of the first and second areas A, B, as indicated in FIG. 2, so that there is a possibility that the vehicle operator starts the engine again.

The DOOR LOCKING STANDBY mode is selected in step S43 when the door-locking system is placed in STATE 3 wherein the portable unit 32 is detected in only the second area B while the door 20 is closed. When this mode is selected, a control program for performing a door locking standby control is executed as explained below by reference to the flow chart of FIG. 8, such that the closed door 20 is automatically locked where a predetermined condition is satisfied. In this case, there is a high possibility that the vehicle operator is located in a part C of the second area B, which part C is outside the first area A. In view of this high possibility, it is desirable to lock the closed door 20.

The DOOR LOCKING STANDBY mode is selected in step S43 also when the door-locking system is placed in STATE 4 wherein the portable unit 32 is detected in neither the first area A nor the second area B, namely, detected in an area E outside the first and second areas A, B, while the door 20 is closed, but is detected in the second area B while the door 20 is open. Namely, the DOOR LOCKING STANDBY mode is selected where the flag F has been set at "1" in step S9. The flag F set at "1" (stored in the RAM of the memory 16) indicates a symptom that the vehicle operator has an intention of getting off the vehicle. On the other hand, the ALARMING AND DOOR LOCKING STANDBY mode is selected in step S45 when the door-locking system is placed in STATE 5 wherein the portable unit 32 is neither detected in the second area B while the door 20 is open, nor detected in the first and second areas A, B while the door 20 is closed. In this STATE 5 wherein the portable unit 32 is not detected in either the first area A or the second area while the door 20 is closed, and is not detected in the second area B while the door 20 is open, there is a possibility that the portable unit 32 is defective or its battery is exhausted, for instance. In view of this, the alarm indicator 58 is activated to inform the vehicle operator of this possibility. Further, the DOOR LOCKING STANDBY mode is established.

Figure 8:
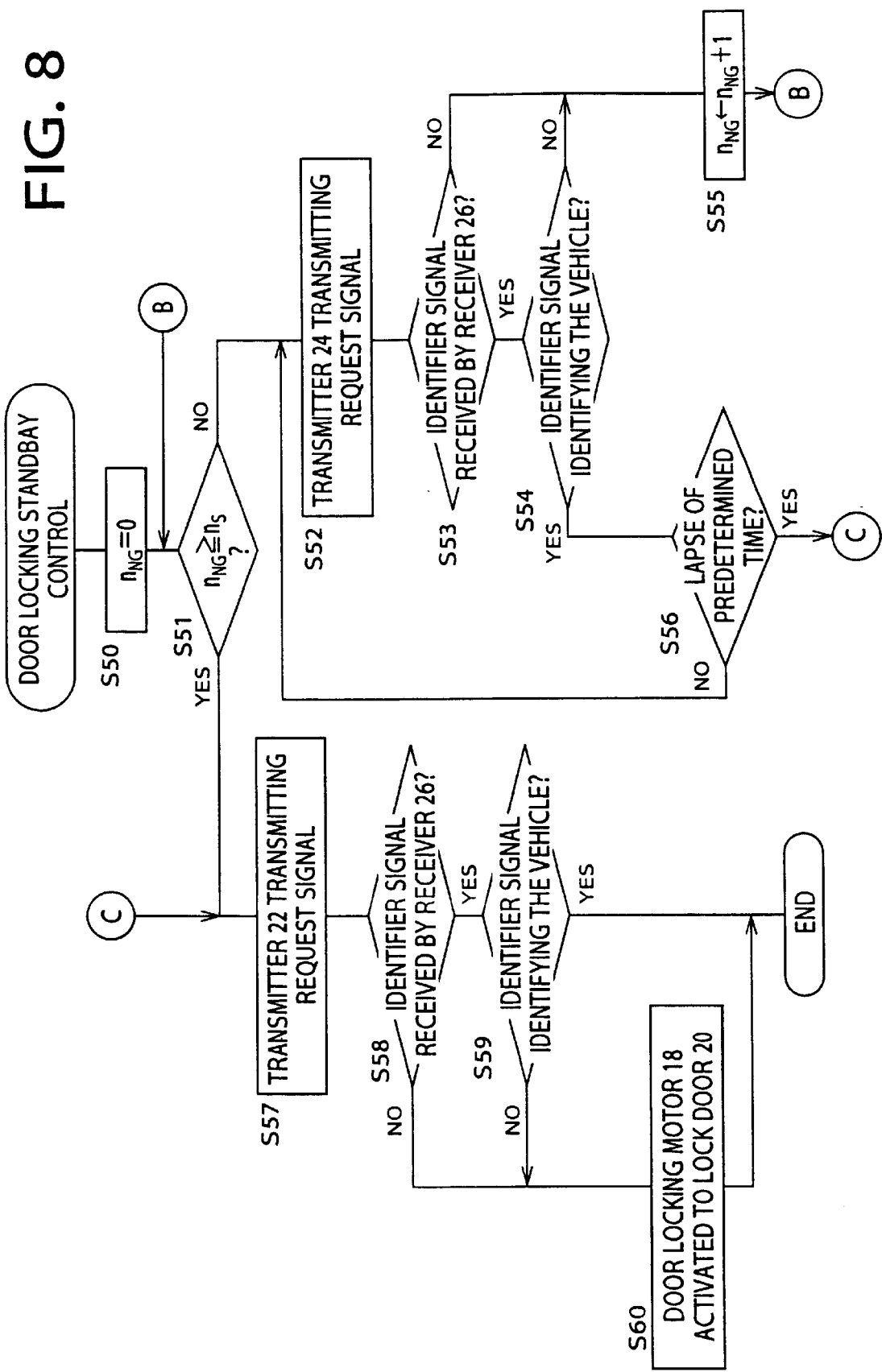
FIG. 8 is a flow chart illustrating a control program stored in the ROM, for controlling a power-operated locking device of the door-locking system in a locking standby mode.

When the DOOR LOCKING STANDBY mode is established, the door locking control program is executed as illustrated in the flow chart of FIG. 8. This control program is formulated to lock the door 20 in the closed position when the vehicle operator is located outside the vehicle and when the portable unit 32 (which also serves as the ignition key in this embodiment) is not left within the vehicle. Namely, the door 20 is locked in at least one of the following two cases: (1) The portable unit 32 (vehicle operator) remains in the second area B for a sufficiently long time, and is not located in the first area A (not left in the interior of the vehicle); and (2) The portable unit 32 (vehicle operator) is kept undetected in the second area B (is presumably located in the area E) for a sufficiently long time while the portable unit 32 is not located in the first area A.

The door locking control program of FIG. 8 is initiated with step S50 to reset a counter $n_{NG}$ to "0". Step S50 is followed by sep S51 to determine whether the count of the counter $n_{NG}$ is equal to or larger than a threshold value $n_s$. When step S51 is implemented for the first time, the count is zero, and a negative decision (NO) is obtained in step S51, so that step S52 is implemented to command the transmitter 24 to transmit the request signal. Step S52 is followed by steps S53 and S54 to determine whether the receiver 26 has received an identifier signal and whether the received identifier signal identifies the vehicle in question. If a negative decision (NO) is obtained in step S53 or S54, the control flow goes to step S55 in which the counter $n_{NG}$ is incremented, and then goes back to step S51. Steps S51–S55 are repeatedly implemented until the predetermined time corresponding to the threshold value $n_s$ has passed. When the predetermined time has passed, and an affirmative decision (YES) is obtained step S51, the control flow goes to step S57.

If an affirmative decision (YES) is obtained in step S54, the control flow goes to step S56 to determine whether a predetermined time T has passed after the receiver 26 has received the identifier signal which identifies the vehicle. Steps S52, S53, S54 and S56 are repeatedly implemented until an affirmative decision (YES) is obtained in step S56, that is, until the predetermined time T has passed. When the affirmative decision (YES) is obtained in step S56, the control flow goes to step S57. The predetermined time T is the sufficiently long time indicated above with respect to the case (1) in which the closed door 20 is locked since the portable unit 32 is held in the second area B for a long time. For instance, the predetermined time T is 30 seconds.

In step S57, the transmitter 22 is operated to transmit the request signal. Step S57 is followed by step S58 to determine whether the receiver 26 has received an identifier signal, and step S59 to determine whether the received identifier signal identifies the vehicle. If a negative decision (NO) is obtained in sep S58 or S59, the control flow goes to step S60 in which the driver circuit 14 is controlled to activated the door locking motor 18 for locking the door 20 in the closed position. If an affirmative decision (YES) is obtained in step S59, the motor 18 is not operated so that the door 20 is held in the unlocked state.

As described above, the door-locking system according to the present embodiment is arranged such that the DOOR LOCKING STANDBY mode is established when the portable unit 32 is detected in the area B after the door 20 has been opened, even if the portable unit 32 is not detected after the door 20 has been closed. In this case, the door 20 is locked when the predetermined condition is satisfied as described above by reference to the flow chart of FIG. 8. This arrangement permits locking of the door 20 even when the vehicle operator who has got off the vehicle quickly swings the door 20 back to the closed position, whereby the operating reliability of the system is improved. Thus, steps S52–S54 and S57–S59 are implemented to detect the position of the portable unit 32 when there is detected a high probability that the vehicle operator has an intention of getting off the vehicle.

The door 20 is locked also when the system is placed in STATE 3 wherein the vehicle operator remains in the part C of the second area B for a long time. The door 20 is locked also when the system is placed in STATE 4 wherein the portable unit 32 is not detected after the door 20 has been closed.

When the door 20 is closed, the determination as to whether the portable unit 32 is detected in the first area A and the determination as to whether the portable unit 32 is detected in the second area B are both effected, so that whether the door locking motor 18 is controlled based on the exact position of the portable unit 32. The reliability of the control of the door locking motor 18 is further improved owing to the detection of the portable unit 32 after the door 20 is opened and the detection of the same after the door 20 is closed. In addition, the alarm indicator 58 is activated if the portable unit 32 is neither detected while the door 20 is open, nor detected while the door 20 is closed. In this case, the vehicle operator is informed that the portable unit 32 is defective, or its battery is exhausted.

The transmission of the request signal from the transmitter 24 is terminated when the identifier signal received by the receiver 26 identifies the vehicle, so that the consumption of the electric energy is reduced. Further, the transmitter 24 is adapted to intermittently transmit the request signal at the predetermined time interval, until the receiver 26 has received the identifier signal which identifies the vehicle. The intermittent transmission of the request signal requires a reduced amount of electric energy, than continuous transmission of the same.

In the present embodiment, it is determined that there is a symptom that the vehicle operator has an intention of getting off the vehicle, where the door 20 is opened while the ignition switch 56 is off. Namely, it is not determined that there is the above-indicated symptom, where the ignition switch 56 is merely turned off or where the output signal of the seat-belt switch 59 indicates that the vehicle operator has released the seat belt. The present arrangement assures increased reliability in the determination that the vehicle operator has an intention of getting off the vehicle, and is effective to avoid unnecessary transmission of the request signal requesting the portable unit 32 to transmit the identifier signal, resulting in a reduced amount of consumption of electric energy by the door-locking system.

It will be understood that the two communication devices 27, 28 cooperate to constitute a plurality of specific-area communication devices adapted to detect the portable unit 32 in the respective first and second areas A and B, and also constitute a communication device capable of communicating with the portable unit 32 in the different areas A, B. It will further be understood that the communication device 28 serves as a first communication device operable upon detection of a symptom that the vehicle operator has an intention of getting off the vehicle, and that the communication device 27 serves as a second communication device capable of communicating with the portable unit 32 in the first area A whose major part lies within the vehicle, while the communication device 28 serves as a third communication device capable of communicating with the portable unit 32 in the second area B whose major part is outside the vehicle. It will also be understood that the communication devices 27, 28 cooperate to serve as a fourth communication device operable upon detection of a high probability that the vehicle operator has got off the vehicle.

It will also be understood that the battery 19, door locking motor 18 and driver circuit 14 cooperate to constitute a major portion of a power-operated locking device for locking the door 24, while the door-locking controller in the form of the ECU 10 serves as a locking-device controller for controlling the power-operated locking device. It will also be understood that the power-operated locking device, the locking-device controller and the communication devices 27, 28 cooperate to constitute a major portion of the automatically operated and controlled door-locking system for the automotive vehicle, which may be considered to be a vehicle state control device for controlling the state of a vehicle. The transmitters 22, 24 which include the transistor 35 are adapted to intermittently transmit the request signal under the control of the ECU 10, which is adapted to implement steps S6, S7, S8 and S11.

It will further be understood that a portion of the ECU 10 assigned to implement steps S8 and S10 provides a request terminating portion for terminating the transmission of the request signal upon determination that the received identifier signal identifies the vehicle. It will also be understood that the memory 16 of the ECU 10 serves as a data memory for storing data indicating the above-indicated determination after or upon detection of a symptom that the vehicle operator has an intention of getting off the vehicle. It will further be understood that a portion of the ECU 10 assigned to implement steps S1 and S3 serves as a symptom detecting means for detecting a symptom that the vehicle operator has an intention of getting off the vehicle, and that a portion of the ECU 10 assigned to implement step S21 serves as getting-off detecting means for detecting that the vehicle operator has got off the vehicle.

It will also be understood that a portion of the ECU 10 assigned to implement steps S20-S36 serves as a portable unit detecting device for detecting the position of the portable unit 32 when it is detected that the vehicle operator has got off the vehicle. This portable unit detecting device is capable of detecting the portable unit 32 in the different areas A and B. It will also be understood that a portion of the ECU 10 assigned to detect STATE 4 (implement steps S40, S41, S43 and S44) and to control the driver circuit 14 serves as a control device for selecting a door locking standby mode when the receiver 26 has not received the identifier signal identifying the vehicle, after the detection of a symptom that the vehicle operator has an intention of getting off the vehicle. It will further be understood that a portion of the ECU 10 assigned to implement steps S1–S11 of FIG. 6 serves as a portable unit detecting device for detecting the portable unit 32 after it is detected that the vehicle operator has an intention of getting off the vehicle.

The relationship between the STATES 1–5 and the three control modes indicated in the table of FIG. 9 may be suitably modified. Although the illustrated embodiment is adapted to establish the ENGINE START STANDBY mode in STATE 2 wherein the portable unit 32 is detected in both of the first and second areas A, B, the DOOR LOCKING STANDBY mode may be selected in STATE 2. Namely, the overlapping part D of the first and second areas A, B includes a portion which is outside the vehicle. The door-locking system may be placed in STATE 2 when the portable unit 32 is located in the above-indicated portion of the overlapping part D. While the ALARMING AND DOOR LOCKING STANDBY mode is selected in STATE 5 in the illustrated embodiment, only the alarm indicator 58 may be activated in STATE 5. When the portable unit 32 is detected neither in the first area A nor in the second area B, the portable unit 32 may actually exist within the interior of the vehicle. In this case, it is desirable not to lock the door 20.

The illustrated embodiment is arranged to control the door locking motor 18 on the basis of the results of the two determinations as to whether the portable unit 32 is detected while the door 20 is open and closed, respectively. However, the motor 18 may be controlled on the basis of the result of one of those two determinations. Described in detail, where the portable unit 32 is detected while the door 20 is open, the motor 18 is activated to lock the door 20 soon after the door 20 is closed. Alternatively, the door 20 may be locked a predetermined time after the door 20 is closed. Namely, the execution of the control program of FIG. 8 is not essential. Although the control program of FIG. 6 is adapted to detect the portable unit 32 in the second area B only while the door 20 is open, the control program may be modified to detect the portable unit 32 in the first and second areas A and B while the door 20 is open.

Figure 11:
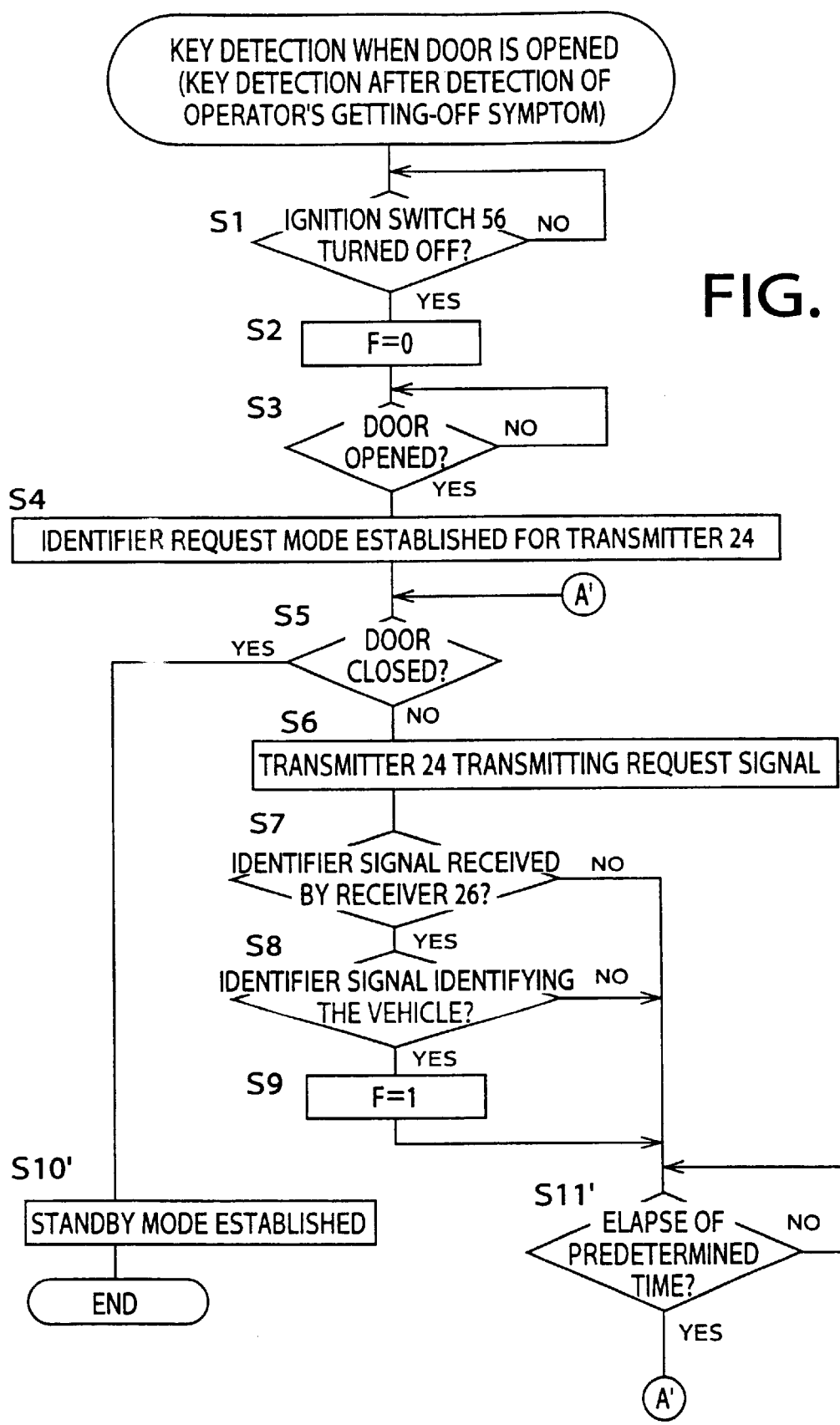
FIG. 11 is a flow chart illustrating a control program used in another embodiment in place of the control program of FIG. 6.

The control program of FIG. 6 may be replaced by a control program illustrated in the flow chart of FIG. 11, in which the transmitter 24 intermittently transmits the request signal at the predetermined time interval even after the affirmative decision (YES) is obtained in step S8, as long as the door 20 is held open. When the door 20 is closed, step S10' is implemented, and the control program is terminated.

In the embodiment of FIG. 11, step S21 of the control program of FIG. 7 is not necessary, because the control program of FIG. 7 is initiated when the door 20 is closed, that is, when the standby mode is establish in step S10'. In the embodiment of FIG. 11, too, the request signal is not continuously transmitted but is intermittently transmitted from the transmitter 24, so that the required electric energy consumption is reduced.

In the embodiments of FIGS. 6 and 11, the transmitter 24 is operated to transmit the request signal where the door 20 is opened while the ignition switch 56 is off. In other words, the ECU 10 determines that there is a symptom that the vehicle operator has an intention of getting off the vehicle. However, the ECU 10 may determine that there is a symptom that the vehicle operator has an intention of getting off the vehicle, when the ignition switch 56 is turned off, and/or when the output signal of the seat-belt switch 59 indicates that the vehicle operator has released the seat belt.

Figure 12:
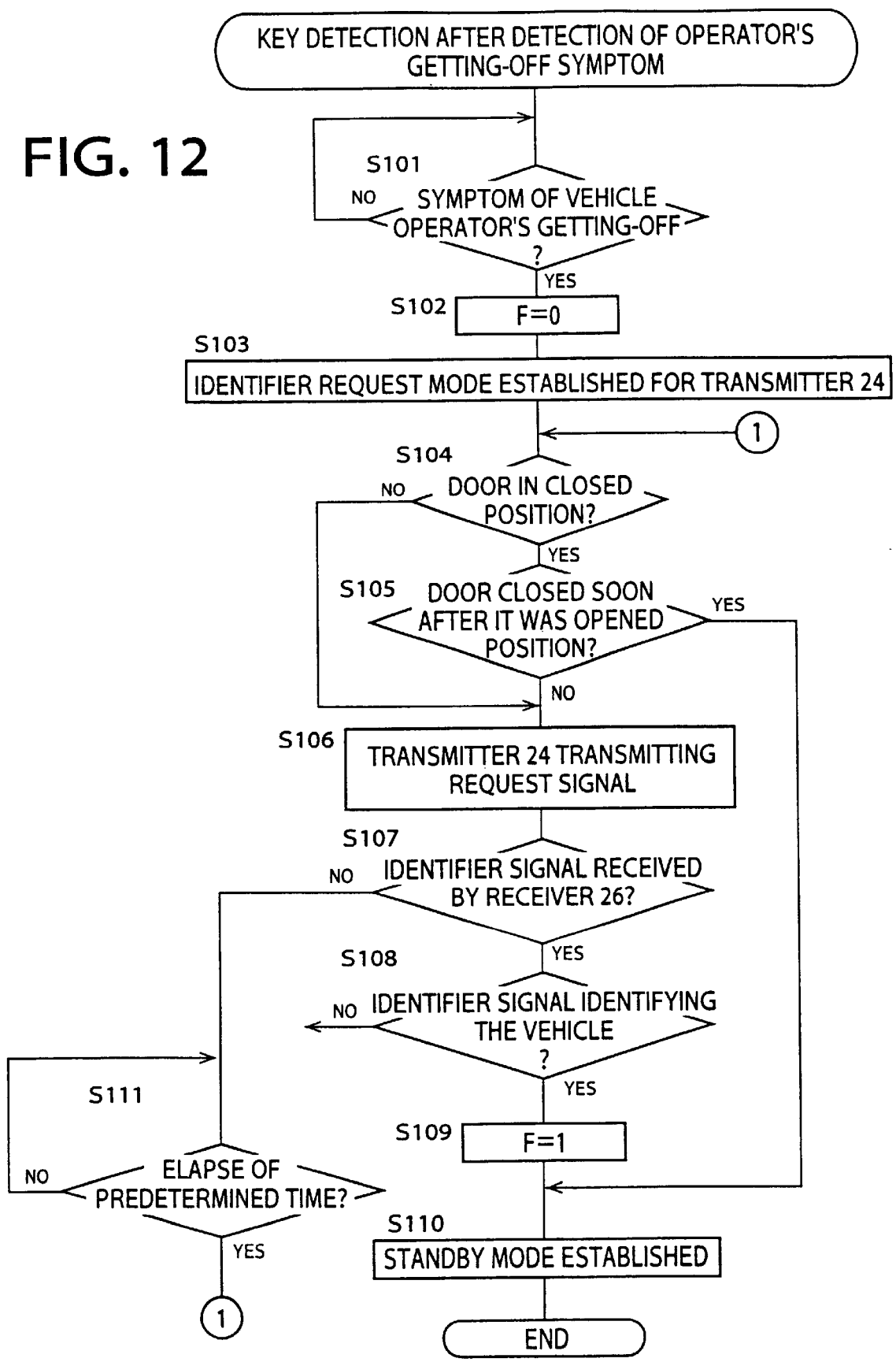
FIG. 12 is a flow chart illustrating a control program in the ROM, for detecting the ignition key when a symptom of the vehicle operator getting off the vehicle has been detected.

For instance, the detection of the portable unit 32 in the second area B may be effected upon detection of the above-indicated symptom, according to a control program as illustrated in the flow chart of FIG. 12. The control program is initiated with step S101 to determine whether the ignition switch 56 is turned off and/or the output signal of the seat-belt switch 59 indicates the vehicle operator's releasing of the set belt. If an affirmative decision (YES) is obtained in step S101, it means that there is a symptom that the vehicle operator has an intention of getting off the vehicle. In this case, the control flow goes to step S102 to reset the flag F to "0", and step S103 in which the identifier request mode is established for the transmitter 24 capable of communicating with the portable unit 32 in the second area B. Then, steps S104 and S105 are implemented to determine whether the door 20 is in the closed position, and determine whether the door 20 has been placed in the closed position within a predetermined short time after the door 20 was opened. If an affirmative decision (YES) is obtained in step S105, it means that there is a high probability that the vehicle operator has got off the vehicle. In this case, the control flow goes to step S110.

If a negative decision (NO) is obtained in step S104, or if an affirmative decision (YES) is obtained in step S104 while a negative decision (NO) is obtained in step S105, it means that the door 20 is opened, or that the door 20 is kept closed after the ignition switch 56 is turned off and/or the vehicle operator has released the seat belt. In these cases, the control flow goes to step S106 in which the identifier request mode is established for the transmitter 22 capable of communicating with the portable unit 32 in the first area A. Then, steps S107–S111 are implemented as described above with respect to steps S7–S11 of FIG. 6.

In the third embodiment of FIG. 12, the identifier request mode is established even where the vehicle operator has released the seat belt while the ignition key 56 is held on. The releasing of the seat belt alone may be an indication that the vehicle operator has an intention of getting off the vehicle. The present embodiment permits locking of the door 20 where the vehicle operator has left the vehicle with the ignition switch 56 held on. In this third embodiment, therefore, the portable unit 32 should not serve as the ignition key used to turn on and off the ignition switch 56. That is, the portable unit 32 must be a member which is carried by the vehicle operator and which is not used as the ignition key. In the third embodiment, the request signal is transmitted even before the door 20 is opened, that is, even while the door 20 is held closed with the negative decision (NO) being obtained in step S105.

In the first embodiment of FIGS. 6–10 and the second embodiment of FIG. 11, the portable unit 32 also serves as the ignition key. However, the first and second embodiments may be modified such that the portable unit 32 does not serve as the ignition key and is exclusively used as a member for detecting the position of the vehicle operator.

While only the front right door 20 used by the vehicle operator is automatically locked as needed in the illustrated embodiment, all or any other door or doors provided on the vehicle may be automatically locked together with the door 20, as needed, while the DOOR LOCKING STANDBY mode is established.

Although the transmitters 22, 24, receiver 26 and portable unit 32 are constructed as shown in FIGS. 3–5, respectively, for illustrative purpose only, those elements may be otherwise constructed.

It will be understood that the present invention may be embodied with various other changes, modifications and improvements, such as those described in the SUMMARY OF THE INVENTION, which may occur to those skilled in the art.

What is claimed is:

1. An automatically controlled door-locking system for automatically locking at least one door of a vehicle, which includes a vehicle-operator's door provided for an operator of the vehicle, said door-locking system comprising:
    a power-operated locking device including a power source, and an actuator operated by said power source for selectively locking and unlocking said at least one door placed in a closed position thereof;
    a symptom detecting device operable to detect a symptom indicating that the operator of the vehicle has an intention of getting off the vehicle;
    a portable unit to be carried by said operator;
    a first communication device operable to communicate with said portable unit while said portable unit is located within a predetermined communication area, said first communication device including a first identifier-signal requesting device and a first signal-receiving device, said first identifier-signal requesting device being operable, upon detection of said symptom by said symptom detecting device, to transmit to said portable unit a request signal requesting said portable unit to transmit back to said first signal-receiving device an identifier signal representative of an identifier identifying said portable unit; and
    a locking-device controller, operable when said identifier represented by said identifier signal received by said first signal-receiving device matches an identifier identifying said vehicle, to operate said power-operated locking device for locking said at least one door after said vehicle-operator's door is closed.

2. An automatically controlled door-locking system according to claim 1, wherein said symptom detecting device detects said symptom, when the vehicle is placed in a state in which the vehicle is not likely to be started and/or when a seat belt which has been used by the vehicle operator is released.

3. An automatically controlled door-locking system according to claim 1, wherein said symptom detecting device detects said symptom, when said vehicle-operator's door is operated from a closed position thereof to an open position thereof.

4. An automatically controlled door-locking system according to claim 1, wherein said locking-device controller includes portable-unit detecting device for determining that said portable unit is located within said predetermined communication area, when said identifier represented by said identifier signal received by said first signal-receiving device of said first communication device matches said identifier of said vehicle, said locking-device controller operating said power-operated locking device to lock said at least one door in the closed position, when said portable-unit detecting device has determined that said portable unit is located within said predetermined communication area.

5. An automatically controlled door-locking system according to claim 1, wherein said first identifier-signal requesting device intermittently transmits said request signal at a predetermined time interval after detection of said symptom by said symptom detecting device.

6. An automatically controlled door-locking system according to claim 5, wherein said first identifier-signal requesting device transmits said request signal at a first predetermined time interval before a predetermined condition is satisfied, and at a second predetermined time interval longer than said first predetermined time interval after said predetermined condition is satisfied.

7. An automatically controlled door-locking system according to claim 1, wherein said locking-device controller includes at least one of a data memory for storing data indicative of a determination that said identifier represented by said identifier signal received by said first signal-receiving device matches said identifier of said vehicle, and a request terminating portion, operable upon said determination, to command said first identifier-signal requesting device to terminate transmission of said request signal.

8. An automatically controlled door-locking system according to claim 1, further comprising an indicator operable when said identifier represented by said identifier signal received by said first signal-receiving device matches said identifier of the vehicle, to provide an indication that said identifier represented by said identifier signal matches said identifier of the vehicle.

9. An automatically controlled door-locking system according to claim 1, wherein when said identifier represented by said identifier signal received by said first signal-receiving device of said communication device matches said identifier of the vehicle, said locking-device controller operates said power-operated locking device to lock said at least one door when a predetermined condition is satisfied after said vehicle-operator's door is closed.

10. An automatically controlled door-locking system according to clam 9, wherein said locking-device controller includes a portion operable after said vehicle-operator's door is closed, to establish a door locking standby mode in which said power-operated locking device is operated to lock said at least one door when said predetermined condition is satisfied.

11. An automatically controlled door-locking system according to claim 9, further comprising:
    a second communication device including a second identifier-signal requesting device for transmitting said request signal to said portable unit, and a second signal-receiving device for receiving said identifier signal transmitted from said portable unit, said second communication device being capable of communicating with said portable unit while said portable unit is located within a first area whose major part lies within said vehicle;
    a third communication device including a third identifier-signal requesting device for transmitting said request signal to said portable unit, and a third signal-receiving device for receiving said identifier signal transmitted from said portable unit, said third communication device being capable of communicating with said portable unit while said portable unit is located within a second area whose major part is outside said vehicle, and wherein said locking-device controller comprises:

a first portable-unit detecting device for determining whether said portable unit is located within said first area, depending upon whether an identifier represented by said identifier signal received by said second signal-receiving device of said second communication device matches the identifier of the vehicle;

a second portable-unit detecting device for determining whether said portable unit is located within said second area, depending upon whether an identifier represented by said identifier signal received by said third signal-receiving device of said third communication device matches the identifier of the vehicle, said locking-device controller operating said power-operated locking device after said vehicle-operator's door is closed, and (a) when said second portable-unit detecting device determines that said portable unit is held in said second area for more than a predetermined time while said first portable-unit detecting device determines that said portable unit is not located within said first area, or (b) when said first and second portable-unit detecting devices determine that said portable unit is not located in either of said first and second areas.

12. An automatically controlled door-locking system according to claim 1, further comprising:

getting-off detecting means for detecting a high probability that the operator of the vehicle has got off the vehicle; and a fourth communication device operable upon detection of said high probability by said getting-off detecting means and capable of communicating with said portable device while said portable unit is located within a predetermined area, said fourth communication device including a fourth identifier-signal requesting device for transmitting said request signal, and a fourth signal-receiving device for receiving said identifier signal transmitted from said portable unit;

and wherein said locking-device controller includes:

a third portable-unit detecting device for determining whether said portable unit is located within said predetermined area of said fourth communication device, depending upon whether an identifier represented by said identifier signal received by said fourth signal-receiving device matches the identifier of the vehicle; and control means operable when said identifier represented by said identifier signal received by said first signal-receiving device of said first communication device matches the identifier of the vehicle, to operate said power-operated locking device for locking said at least one door after said third portable-unit detecting device has determined that said portable unit is not located within said predetermined area of said fourth communication device.

13. An automatically controlled door-locking system according to claim 12, wherein said locking-device controller includes a data memory for storing data indicative of a determination that said identifier represented by said identifier signal received by said first signal-receiving device of said first communication device matches said identifier of said vehicle, said system further comprising an indicator operable when said third portable-unit detector device has determined that said portable unit is not located within said predetermined area of said fourth communication device, said indicator providing an indication that said identifier represented by said identifier signal received by said first signal-receiving device matches said identifier of the vehicle.

14. An automatically controlled door-locking system for automatically locking at least one door of a vehicle, which includes a vehicle-operator's door provided for an operator of the vehicle, said door-locking system comprising:

a power-operated locking device including a power source, and an actuator operated by said power source for selectively locking and unlocking said at least one door placed in a closed position thereof;

a symptom detecting device operable to detect a symptom indicating that the operator has an intention of getting off the vehicle;

a portable unit to be carried by said operator;

a first communication device operable to communicate with said portable unit while said portable unit is located within a predetermined first area, said first communication device including a first identifier-signal requesting device and a first signal-receiving device, said first identifier-signal requesting device being operable, upon detection of said symptom by said symptom detecting device, to transmit to said portable unit a request signal requesting said portable unit to transmit back to said first signal-receiving device an identifier signal representative of an identifier identifying said portable unit;

getting-off detecting means for detecting a high probability that the operator of the vehicle has got off the vehicle;

a fourth communication device operable upon detection of said high probability by said getting-off detecting means and capable of communicating with said portable device while said portable unit is located within a predetermined second area, said fourth communication device including a fourth identifier-signal requesting device for transmitting said request signal, and a fourth signal-receiving device for receiving said identifier signal transmitted from said portable unit; and a locking-device controller including (a) a first portable-unit detecting device for determining whether said portable unit is located within said predetermined first area of said first communication device, depending upon whether an identifier represented by said identifier signal received by said first signal-receiving device matches the identifier of the vehicle, and (b) a second portable-unit detecting device for determining whether said portable unit is located within said predetermined second area of said fourth communication device, depending upon whether an identifier represented by said identifier signal received by said fourth signal-receiving device matches the identifier of the vehicle, said locking-device controller operating said power-operated locking device to lock said at least one door of the vehicle, on the basis of at least one of output signals of said first and second portable-unit detecting devices.

15. An automatically controlled door-locking system according to claim 14, wherein each of at least one of said first and fourth communication devices is a communication device capable of communicating with said portable unit in a plurality of predetermined different communication areas, and wherein each of at least one of said first and second portable-unit detecting devices which corresponds to said at least one of said first and fourth communication devices is a portable-unit detecting device capable of detecting said portable unit in said plurality of predetermined different communication areas, respectively.

16. An automatically controlled door-locking system for automatically locking at least one door of a vehicle, which includes a vehicle-operator's door provided for an operator of the vehicle, said door-locking system comprising:

a power-operated locking device including a power source and an actuator operated by said power source for selectively locking and unlocking said at least one door placed in a closed position thereof;

a portable unit to be carried by said operator;

a communication device including an identifier-signal requesting device and a signal-receiving device, said identifier-signal requesting device being operable to transmit to said portable unit a request signal requesting said portable unit to transmit back to said signal-receiving device an identifier signal representative of an identifier identifying said portable unit, said communication device being capable of communicating with said portable unit in a plurality of different communication areas; and a locking-device controller including a portable-unit detecting device for determining whether said portable unit is located within each of said plurality of different communication areas, by determining whether said identifier represented by said identifier signal received by said signal-receiving device matches an identifier identifying the vehicle, said locking-device controller operating said power-operated locking device to lock said at least one door of the vehicle, on the basis of results of determinations by said portable-unit detecting device as to whether said portable unit is located within each of at least two areas of said plurality of different communication areas.

17. An automatically controlled door-locking system according to claim 16, wherein said communication device includes a plurality of specific-area communication devices capable of communicating with said portable unit located in respective different specific communication areas;

said identifier-signal requesting device of each of at least one of said plurality of specific-area communication devices being operable to transmit said request signal upon detection of a symptom indicating that the operator of the vehicle has an intention of getting off the vehicle, and wherein said locking-device controller controls said power-operated locking device on the basis of results of determinations by said portable-unit detecting device as to whether said portable unit is located within each of at least two areas of said different specific communication areas, which at least two areas include at least one of said different specific communication areas within which said portable unit is communicable with said at least one of said plurality of specific-area communication devices whose identifier-signal requesting device is operable upon detection of said symptom.

18. An automatically controlled door-locking system according to claim 16, wherein said locking-device controller includes an abnormality detecting device which detects an abnormality of said portable unit if the portable-unit detecting device determines that the portable unit is located within none of said at least two areas of said plurality of different communication areas.

19. An automatically controlled door-locking system according to claim 16, wherein said communication device includes an internal communication device capable of communicating with said portable unit located within a first area whose major part lies within said vehicle, and an external communication device capable of communicating with said portable unit located within a second area whose major part is outside said vehicle, and wherein said locking-device controller operates said power-operated locking device to lock said at least one door of the vehicle, on the basis of results of determinations by said portable-unit detecting device as to whether said portable unit is located within each of said first and second areas of said plurality of different communication areas.

20. A control system provided on a vehicle, for controlling a state of said vehicle on the basis of a result of determination as to whether an identifier represented by an identifier signal received from a portable unit to be carried by an operator of the vehicle matches an identifier identifying the vehicle, said control system comprising:

a symptom detecting device operable to detect a symptom indicating that the operator of the vehicle has an intention of getting off the vehicle; and an identifier-signal requesting device operable upon detection of said symptom by said symptom detecting device, to transmit to said portable unit a request signal requesting said portable unit to transmit said identifier signal.

* * * * *